(12) United States Patent
Polus

(10) Patent No.: US 7,793,481 B2
(45) Date of Patent: Sep. 14, 2010

(54) SYSTEM FOR FABRICATING COMPOSITE PARTS AND AIRCRAFT COMPOSITE PART

(75) Inventor: Jeffrey E. Polus, Hillsboro, IL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 12/576,637

(22) Filed: Oct. 9, 2009

(65) Prior Publication Data

US 2010/0059629 A1    Mar. 11, 2010

Related U.S. Application Data

(62) Division of application No. 11/251,156, filed on Oct. 13, 2005, now Pat. No. 7,624,491.

(51) Int. Cl.
*B64C 1/00* (2006.01)

(52) U.S. Cl. .................. 52/573.1; 52/783.1; 52/787.12; 269/50; 269/54.5; 269/303; 269/900; 269/289 R

(58) Field of Classification Search ............... 52/573.1, 52/787.1–787.12; 269/47–54, 54.4, 54.5, 269/303–306, 900; 156/307.1, 307.3–307.5, 156/307.7
See application file for complete search history.

(56) References Cited

U.S. PATENT DOCUMENTS

| | | | |
|---|---|---|---|
| 3,662,805 A * | 5/1972 | Sygnator | ............... 52/787.12 |
| 4,480,364 A | 11/1984 | Kosmowski | |
| 4,598,453 A | 7/1986 | Wills | |
| 4,945,954 A | 8/1990 | Wehrly, Jr. et al. | |
| 5,046,707 A | 9/1991 | Allen | |
| 5,181,304 A | 1/1993 | Piotrowski | |
| 5,915,678 A | 6/1999 | Slocum et al. | |
| 5,961,107 A | 10/1999 | Morghen | |
| 6,128,880 A * | 10/2000 | Meenan, Jr. | ................ 52/489.1 |
| 6,655,535 B2 | 12/2003 | Wark et al. | |

* cited by examiner

*Primary Examiner*—Richard E Chilcot, Jr.
*Assistant Examiner*—Matthew J Smith
(74) *Attorney, Agent, or Firm*—Yee & Associates, P.C.; Brett L. Halperin

(57) ABSTRACT

The present application is directed to systems for controlling the direction of thermal expansion of a composite part during thermal processing. The systems may comprise at least one guiding mechanism capable of being attached to a surface of a tool for fabricating composites and at least one moveable composite insert capable of being attached to a composite part. The moveable composite insert has an opening for receiving the at least one guiding mechanism. The opening is capable of controlling movement of the at least one moveable composite insert in a desired direction during thermal expansion of the composite part, when the guiding mechanism is received by the opening. Methods for controlling the direction of thermal expansion of a composite part during thermal processing are also disclosed.

21 Claims, 16 Drawing Sheets

SYSTEM FOR FABRICATING COMPOSITE PARTS AND AIRCRAFT COMPOSITE PART

This application is a divisional of application Ser. No. 11/251,156, filed Oct. 13, 2005, now U.S. Pat. No. 7,624,491.

BACKGROUND OF THE DISCLOSURE

The present application relates to systems and methods for fabricating composites.

Composites have a variety of applications in a broad range of industries, such as aircraft manufacturing, boat hull fabrication, automobile body fabrication, as well as others. The fabrication of a composite often involves formulation of individual composite parts and the alignment and bonding together of those composite parts into a composite assembly. During this fabrication process, the composite is subjected to a number of high temperature curing and bonding operations. Alignment tolerances between the composite parts during the bonding operations can be narrow, for example, on the order of about 0.005 inch. Maintaining proper alignment within such narrow tolerances can be difficult due to thermal expansion and contraction of the composite parts and the tooling apparatus used to form the parts. This is because thermal expansion may cause movement of the composite parts relative to one another and/or the tooling apparatus during the thermal cycles of the bonding and curing operations. The problem is exacerbated where the parts and/or the tooling apparatuses are made from materials having differing coefficients of thermal expansion (CTE), which cause the parts and/or tooling apparatus to expand and contract at different rates.

Failure to maintain alignment within the desired tolerances can cause undesirable structural defects, such as voids or stress risers in the bond lines of the composite parts. These defects may require repair or scrapping of the composite parts altogether, which can be costly.

In the past, the problem of maintaining proper alignment of composite parts of an assembly during thermal processing has been dealt with by installing slotted bushings in the surface of the tooling apparatus used to fabricate the assembly. The composite parts are held in place on the surface of the tooling apparatus using pins inserted into the slots of the bushings. The pins are attached to the composite parts by either cutting mating holes in the wet composite parts through which the pins can be inserted and then curing the pins directly into the composite parts, or by installing transfer pins in the bushings and then back-drilling the hole in the composite part after it is cured. The pins attached to the composite parts move back and forth in the bushings to allow for thermal expansion and contraction of the composite parts during processing.

However, there are certain problems with the above-described methods. For example, the slots in the bushings often fill with resin, which is used to form the composites, and become useless. In cases where back-drilling is employed, the resulting holes in the composites are not always positioned accurately. Further, during multi-step bonding operations, the pins bear upon the sidewalls of the holes in the composites, often causing the mating holes by which the pins are held in the composite parts to become oversized. The oversized mating holes may allow the pins to become improperly positioned in the composite parts, which may result in failure to maintain the proper tolerances for producing an acceptable composite assembly.

SUMMARY OF THE DISCLOSURE

The above-mentioned drawbacks associated with existing systems and methods for fabricating composite parts are addressed by embodiments of the present disclosure, which will be understood by reading and studying the following specification.

One embodiment of the present application is directed to a system for controlling the direction of thermal expansion of a composite part during thermal processing. The system comprises at least one guiding mechanism capable of being attached to a surface of a tool for fabricating composites. The system further comprises at least one moveable composite insert capable of being attached to a composite part and having an opening for receiving the at least one guiding mechanism. The opening has a configuration capable of controlling movement of the composite insert in a controlled manner when the guiding mechanism is received by the opening.

Another embodiment of the present application is directed to an aircraft composite part comprising a composite material and one or more composite inserts attached to the composite material. The one or more composite inserts comprise a first major surface, an opposing second major surface, an outer perimeter edge formed between the first and second major surfaces and an opening formed through the composite insert between the first and second major surfaces.

Another embodiment of the present application is directed to a method for fabricating a composite part. The method comprises attaching at least one stationary composite insert at one or more stationary positions of the composite part and attaching at least one moveable composite insert at one or more moveable positions of the composite part. The at least one stationary composite insert allows the composite part to be held substantially stationary relative to the surface of the tool at the one or more stationary positions of the composite part, and the at least one moveable composite insert allows the composite part to move in a controlled manner at the one or more moveable positions of the composite part.

Yet another embodiment of the present application is directed to a method for fabricating an aircraft composite part on the surface of a tool. The method comprises attaching at least one stationary composite insert at one or more stationary positions of the aircraft composite part, and attaching at least one moveable composite insert at one or more moveable positions of the aircraft composite part. The at least one stationary composite insert allows the aircraft composite part to be held substantially stationary relative to the surface of the tool at the one or more stationary positions of the aircraft composite part, and the at least one moveable composite insert allows the aircraft composite part to move in a controlled manner at the one or more moveable positions of the aircraft composite part.

These and other embodiments of the present application will be discussed more fully in the detailed description. The features, functions, and advantages can be achieved independently in various embodiments of the claimed disclosure, or may be combined in yet other embodiments.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosure.

In the drawings.

DETAILED DESCRIPTION OF THE DISCLOSURE

In the following detailed description, reference is made to the accompanying drawings that form a part thereof, and in which is shown by way of illustration specific exemplary embodiments in which the disclosure may be practiced. These embodiments are described in sufficient detail to enable those skilled in the art to practice the disclosed embodiments, and it is to be understood that modifications to the various disclosed embodiments may be made, and other embodiments may be utilized, without departing from the spirit and scope of the present disclosure. The following detailed description is, therefore, not to be taken in a limiting sense.

Figure 1:
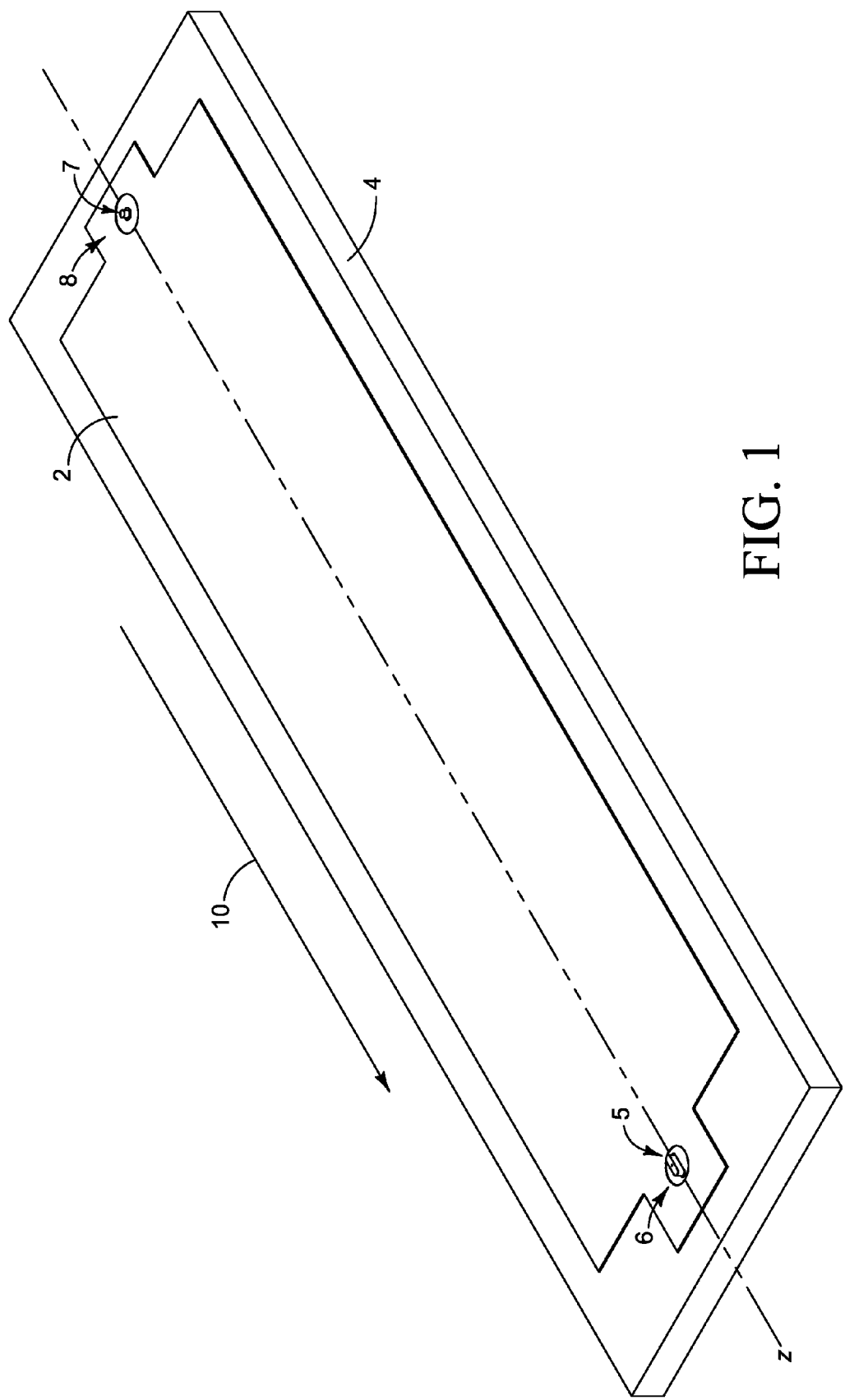
FIG. 1 is a three-dimensional view illustrating top and side surfaces of a composite part, the composite part being positioned relative to the surface of a tool using a system comprising a moveable assembly and stationary assembly, according to one embodiment of the present application.

The present application is generally related to controlling the direction of thermal expansion of a composite part during thermal processing. FIG. 1 illustrates a composite part 2 supported on the surface of a tool 4. While composite part 2 is illustrated as a simple flat panel laminate, the systems and methods of the present application may be used to fabricate composites of any shape and size, including, for example, composites having complex shapes and composite assemblies having multiple composite parts. Composite part 2 may be a part for use in any industry. For example, composite part 2 may be an aircraft composite part, a boat hull composite part, an automobile composite part, or other composite part. In addition, the concepts of the present application are not limited to use with tool 4, as illustrated in FIG. 1, but could be employed with any suitable tool used in bonding, curing or other thermal processes involved in the fabrication of composites, including, for example, molds, bond jigs, and assembly jigs.

In one embodiment, the direction of thermal expansion of a composite part may be controlled with a system comprising one or more moveable assemblies and/or one or more stationary assemblies. For example, in the embodiment of FIG. 1, thermal expansion of composite part 2 may be controlled relative to the surface of tool 4 using a system comprising a moveable assembly 5 and stationary assembly 7. Moveable assembly 5 guides composite part 2 so that composite part 2 moves in a desired direction of thermal expansion relative to the surface of tool 4 at moveable position 6. Stationary assembly 7 holds composite part 2 substantially stationary relative to the surface of tool 4 at stationary position 8 of composite part 2.

Figure 2:
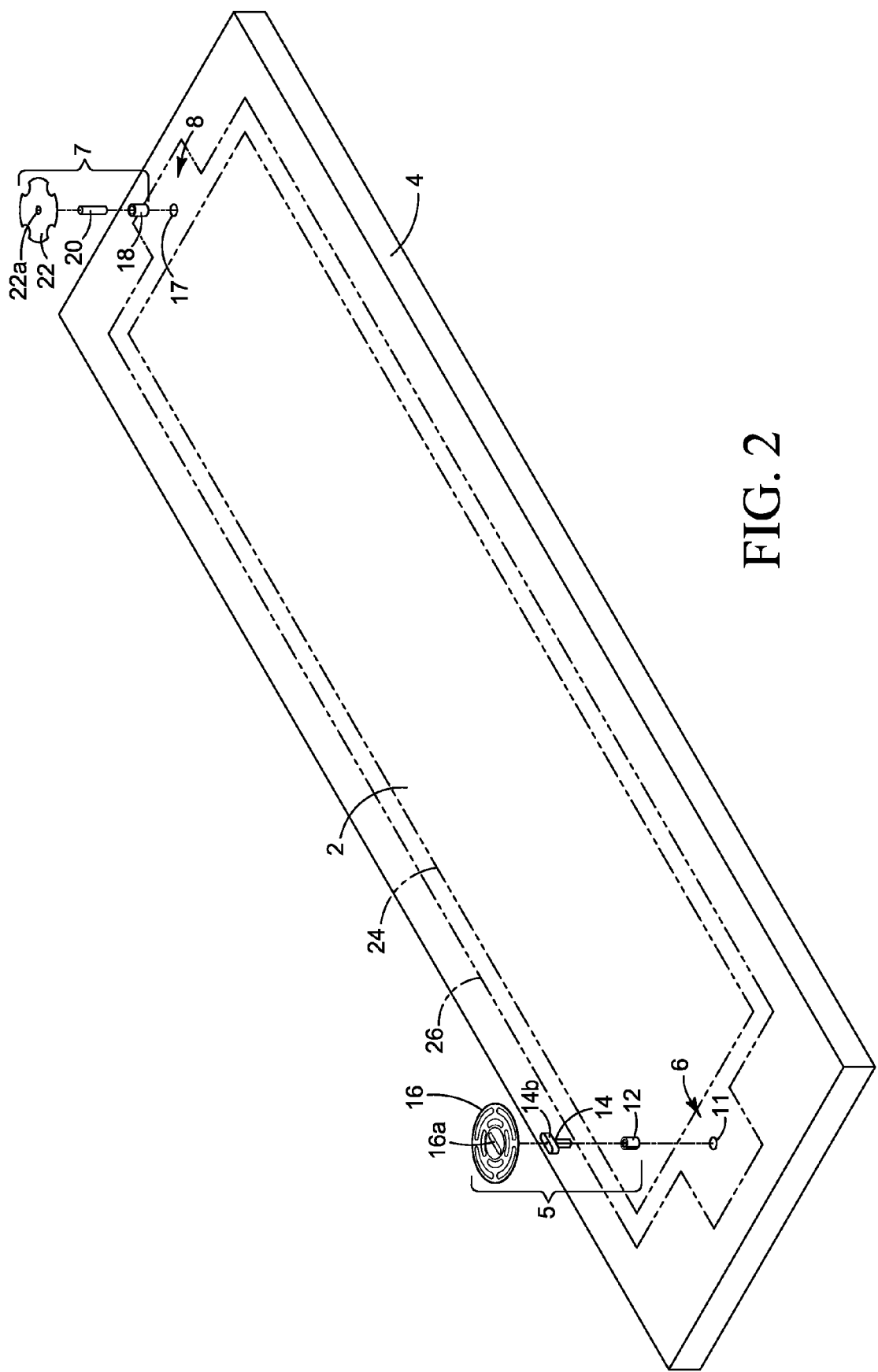
FIG. 2 is a three-dimensional view illustrating top and side surfaces of the tool illustrated in FIG. 1, showing an exploded view of moveable and stationary assemblies, according to one embodiment of the present application.

An exploded view of one embodiment of moveable and stationary assemblies 5 and 7 is shown in FIG. 2. In the FIG. 2 embodiment, moveable assembly 5 comprises alignment pin bushing 12, alignment pin 14 and moveable composite insert 16. Moveable composite insert 16 has an opening 16a, better illustrated in FIG. 5A, for receiving alignment pin 14. Opening 16a has a configuration capable of controlling movement of moveable composite insert 16 in a controlled manner when alignment pin 14 is received by opening 16a. Alignment pin 14 may be attached to the surface of tool 4 via alignment pin bushing 12. In this manner, alignment pin 14 may act as a guiding mechanism for guiding moveable composite insert 16 relative to the surface of tool 4.

In the embodiment of FIG. 2, stationary assembly 7 comprises a stationary pin bushing 18, a stationary pin 20 and a stationary composite insert 22. As illustrated in FIG. 2, stationary pin 20 may extend through opening 22a of stationary composite insert 22 and into stationary pin bushing 18, which in turn may be inserted into hole 17 in the surface of tool 4. Stationary pin 20 has a cross section having approximately the same dimensions as opening 22a in stationary composite insert 22, so that stationary composite insert 22 fits snugly around stationary pin 20, and is thereby held substantially stationary relative to the surface of tool 4.

Figure 9:
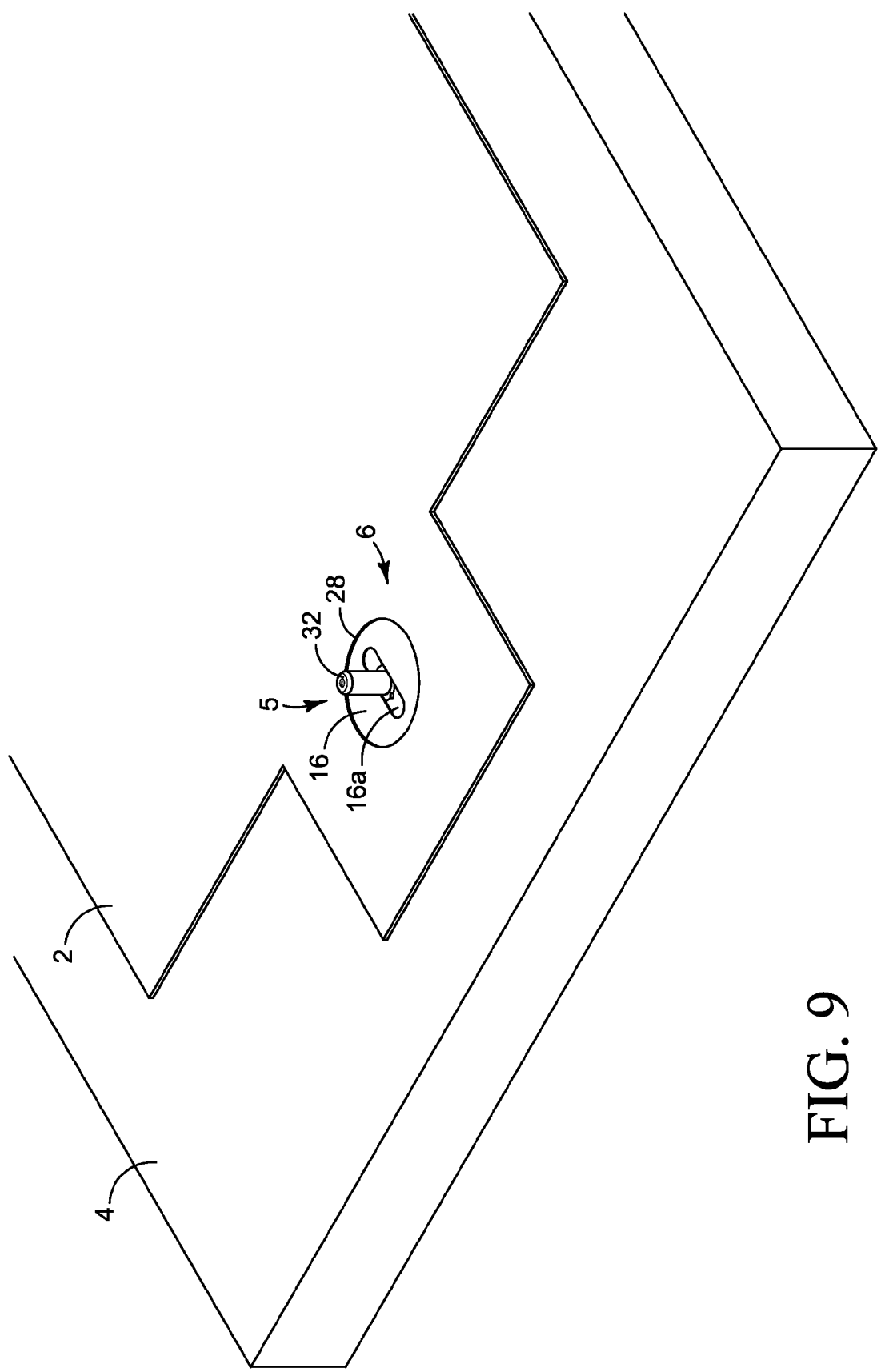
FIG. 9 is a magnified three-dimensional view of a moveable assembly similar to that shown in FIG. 1, where the alignment pin has been replaced by a straight pin, according to one embodiment of the present application.

The one or more moveable assemblies and one or more stationary assemblies are not limited to the embodiment illustrated in FIG. 2. For example, the guiding mechanism of the moveable assembly is not limited to alignment pin 14. Rather, any suitable means for guiding moveable composite insert 16 relative to the surface of tool 4 may be employed, such as, for example, straight pin 32, as illustrated in FIG. 9 and described in greater detail below. In another embodiment, alignment pin 14 and stationary pin 20 can be inserted directly into holes in the surface of tool 4, rather than employing alignment pin bushing 12 and stationary pin bushing 18. Other variations of the above embodiments would be readily apparent to one of ordinary skill in the art, and fall within the scope of the present application.

Moveable composite insert 16 and stationary composite insert 22 may be attached to composite part 2 by any suitable means. In one embodiment, moveable composite insert 16 and stationary composite insert 22 may be attached by curing the inserts in place in composite part 2, as will be discussed in detail below.

As discussed above, opening 16a has a configuration capable of controlling movement of moveable composite insert 16 in a controlled manner. For example, in one embodiment, opening 16a may control movement of moveable composite insert 16 in a desired direction relative to stationary position 8 and/or relative to the surface of tool 4. The desired direction may be any suitable direction, as will be discussed in greater detail below. In one embodiment, the desired direction may be along the major axis of thermal expansion. The major axis of thermal expansion is generally defined as an axis along which the greatest thermal expansion occurs for a given change in temperature. As is well known in the art, the greatest thermal expansion will generally occur along the longest dimension, or longitudinal axis, of a composite part. For example, in the embodiment of FIG. 1, thermal expansion may be guided in the direction of arrow 10 relative to stationary position 8, along the longitudinal axis z of composite part 2.

The desired direction of thermal expansion relative to stationary position 8 may be the same or different than the desired direction of thermal expansion relative to the surface of tool 4, depending on whether the surface of tool 4 has a larger or smaller CTE than the CTE of composite part 2. If, for example, the surface of tool 4 has a smaller CTE than the material of composite part 2 in FIG. 1, the direction of thermal expansion of composite part 2 relative to the surface of tool 4 will also be in the direction of arrow 10. However, if the surface of tool 4 has a larger CTE than the material of composite part 2, than the direction of thermal expansion of composite part 2 relative to the surface of tool 4 may be in the opposite direction of arrow 10.

While FIG. 1 illustrates a single moveable assembly 5 and a single stationary assembly 7 at either end of composite part 2, other embodiments may employ a plurality of moveable assemblies and/or a plurality of stationary assemblies. As will be discussed in greater detail below, the at least one moveable assembly and the at least one stationary assembly may be arranged in any suitable configuration, depending on the shape and size of a particular composite part, in order to achieve the desired direction of thermal expansion.

FIG. 2 further illustrates an excess part line 26, which is an outline of composite part 2 as it appears during processing, similarly as shown in FIG. 1. Net part line 24 is an outline of the finished composite part 2 after processing is complete. In one embodiment, stationary composite insert 22 and moveable composite insert 16 may be placed in the excess composite part 2, or offal, which is the portion of the composite between the net part line 24 and the excess part line 26. After processing is complete, composite part 2 may be trimmed to remove the offal, including the stationary and moveable composite inserts.

In other embodiments, it may be desirable to place composite inserts 16 and 22 within net part line 24, so they are attached to the portion of composite part 2 which will comprise the finished part. Thus, composite inserts 16 and 22 may be removed from finished composite part 2 after processing is complete, or alternatively, the composite inserts may remain in finished composite part 2.

A more detailed description of various embodiments of moveable assembly 5 and stationary assembly 7 will now be provided.

Figure 3A:
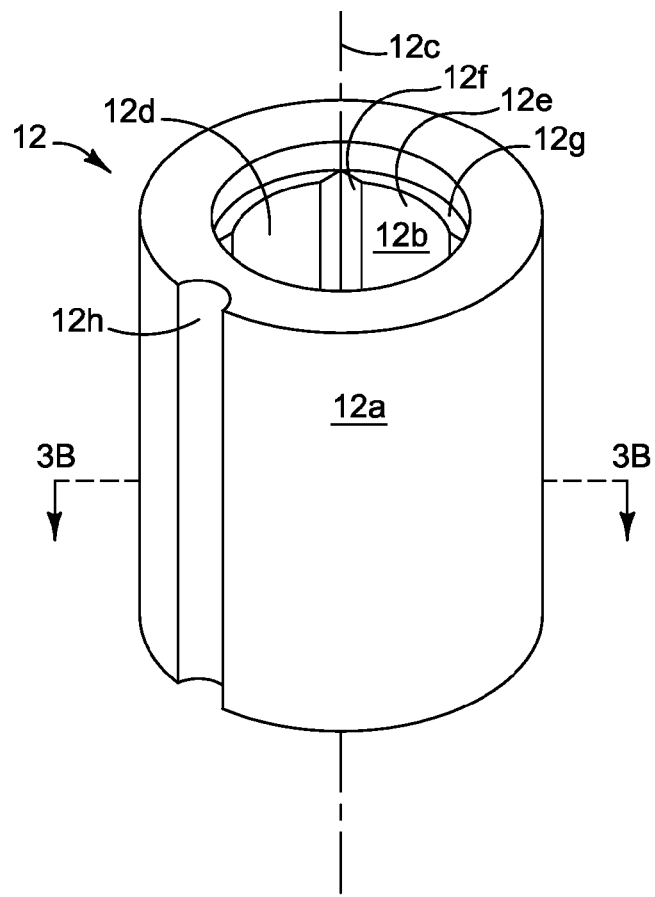
FIGS. 3A to 3E are three-dimensional and cross sectional views illustrating alignment pin bushings, according to various embodiments of the present application.
Figure 3B:
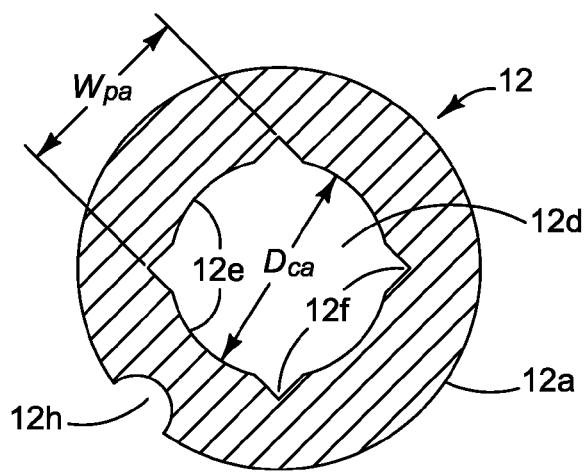

FIGS. 3A and 3B illustrate one embodiment of an alignment pin bushing 12 comprising a liner having an outer surface 12a and an inner surface 12b formed concentrically around a central longitudinal axis 12c. Inner surface 12b defines the dimensions of an aperture 12d, which is also formed along the central longitudinal axis 12c.

In one embodiment, aperture 12d has a non-circular cross section formed in a plane intersecting the central longitudinal axis 12c at right angles. For example, aperture 12d may have a cross section having a shape defined by the outer most perimeter of a concentric, overlapping polygon and circle. The polygon may be any suitable polygon, such as a triangle, square, pentagon, hexagon, heptagon, or octagon.

FIGS. 3A and 3B illustrate one such embodiment where the polygon is a square. The sides of the square intersect the circle so that the outer most perimeter of the concentric overlapping polygon and circle form the cross-sectional shape of aperture 12d, shown in FIG. 3B. Aperture 12d comprises cylindrically shaped surface portions 12e and grooved surface portions 12f. Cylindrically shaped surface portions 12e correspond to portions of the circle which intersect with, and lie outside of, the polygon; and grooved surface portions 12f correspond to portions of the square, including vertices and side portions, which intersect with, and lie outside of, the circle. As shown in FIGS. 3A and B, this arrangement results in the inner surface 12b having a plurality of alternating cylindrically shaped surface portions 12e and grooved surface portions 12f. Grooved surface portions 12f run longitudinally along inner surface 12b in parallel with central longitudinal axis 12c.

The cylindrically shaped surface portions and the grooved surface portions are arranged so that the aperture is capable of accepting both a pin having a shank with a circular cross section in frictional slip fit with the cylindrically shaped surface portions 12e, as well as a pin having a shank with a noncircular cross section, such as a square, in frictional slip fit with the grooved surface portions 12f of inner surface 12b. Examples of pins with noncircular and circular cross sections are illustrated in FIG. 4 and FIG. 8, respectively, which will be described in greater detail below.

The relative dimensions of aperture 12d and the circular and noncircular shanks of the corresponding pins may be adjusted to maintain the desired degree of precision in positioning the guiding mechanism. FIG. 3B illustrates a width $W_{pa}$ and a diameter $D_{ca}$ of the aperture 12d, which correspond to a width, $W_s$, of shank 14a in FIG. 4B and a diameter $D_s$, of shank 32a in FIG. 8B. In embodiments where high alignment tolerances of composite parts in subsequent bonding processes is desired, the relative sizes of these dimensions may be adjusted to achieve the desired tolerances. In one embodiment, $W_{pa}$ may be formed to be only slightly larger than $W_s$, so that a high tolerance slip fit is achieved. For example, $W_{pa}$ may be less than about 0.01 inches larger than $W_s$. In another exemplary embodiment, $W_{pa}$ may be about 0.001 to about 0.0001 inches larger than $W_s$. Similar tolerances may apply to the relative sizes of $D_{ca}$ and $D_s$.

Figure 3C:
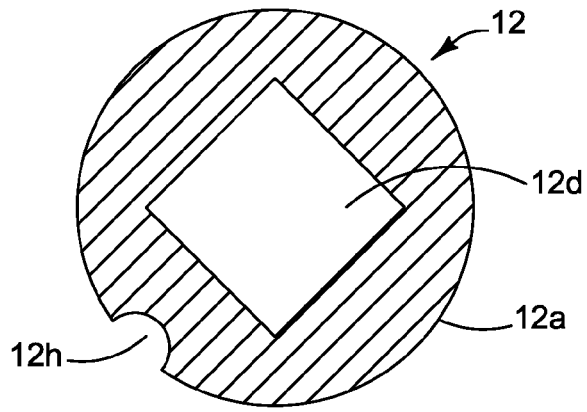
Figure 3D:
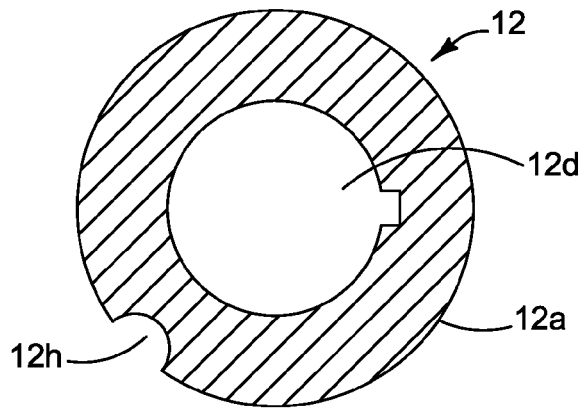

Aperture 12d is not limited to the shape illustrated in FIGS. 3A and 3B, but may be any suitable noncircular shape which allows the head of alignment pin 14 to be fixed in a desired direction, as will be discussed in greater detail below. In certain embodiments, aperture 12d may have a cross section which has the shape of a triangle, square, or other polygon shape. For example, an embodiment of a bushing with a square cross section is illustrated in FIG. 3C. In yet other embodiments, aperture 12d may have only one or two cylindrically shaped surface portions 12e and one or two grooved surface portions 12f which run longitudinally along the inner surface 12b in parallel with central longitudinal axis 12c. For example, a cross sectional view of a bushing with a single groove is illustrated in FIG. 3D. Other suitable shapes would be readily apparent to one of ordinary skill in the art and are within the scope of the present application.

As illustrated in FIG. 3A, alignment pin bushing 12 also may include an optional groove 12g positioned in the inner surface 12b at one end of aperture 12d. Groove 12g is shaped to accept an O-ring, such as the O-ring 14e positioned around the shank 14a of alignment pin 14 illustrated in FIG. 4C.

Alignment pin bushing 12 may be formed by any suitable process. For example, in one embodiment, grooved surface portions 12f are formed by machining the cylindrically shaped inner surface of a standard bushing. One example of a suitable machining technique for forming grooved surface portions 12f is electric discharge machining (EDM). In this embodiment, an anode having the desired dimensions may be employed to burn grooved surface portions into the cylindrical inner surface of a bushing. For example, a square anode may be used to form the four grooved surface portions 12f illustrated in the embodiment of FIG. 3B. In other embodiments, bushings which have any number of grooves may be formed. For example, bushings which have six or eight grooved surface portions may be formed using hexagon or octagon shaped anodes.

Alignment pin bushing 12 may be made from any suitable material. Examples of suitable materials include stainless steel, spring steel, ceramics, carbon and Teflon.

Figure 3E:
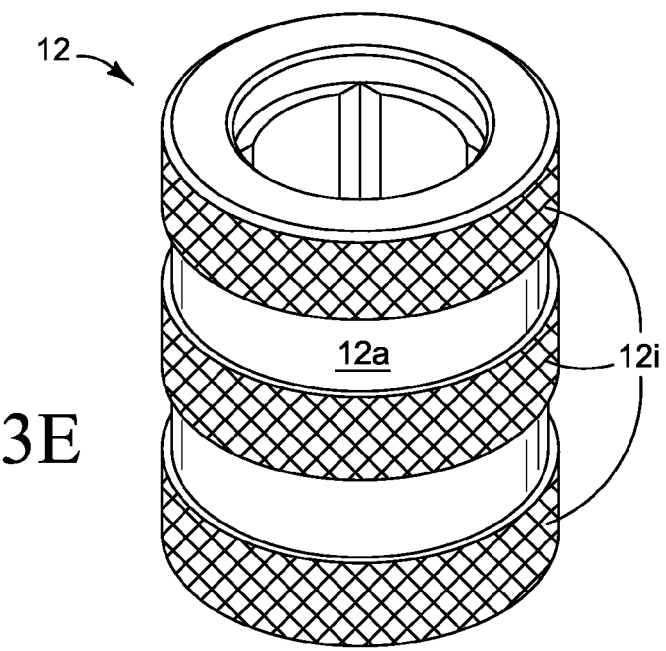

Referring back to FIG. 2, the orientation of the alignment pin bushing 12 in the surface of the tool 4 may determine the orientation of the head 14b of alignment pin 14, which in turn determines the orientation of opening 16a of the moveable insert, as will be discussed in greater detail below. The alignment pin bushing may be fixed in the desired orientation by any suitable means. In certain embodiments, outside surface 12a is configured so as to fix the orientation of the alignment pin bushing in tool 4. For example, in the embodiment illustrated in FIG. 3A, a roll-pinned groove 12h is formed along outside surface 12a of alignment pin bushing 12. A corresponding groove (not shown) is also formed in hole 11 of tool 4, illustrated in FIG. 2. Alignment pin bushing 12 may then be fixed in the surface of tool 4 in the desired orientation by inserting pin 13, illustrated in FIG. 6, in the aperture formed by aligning the groove in hole 11 with roll-pinned groove 12h. In an alternative embodiment, outside surface 12a is provided with a knurled finish, which allows alignment pin bushing 12 to maintain the correct orientation by friction fit. One example of a knurled finish is illustrated in FIG. 3E, which shows knurled portions 12i. Other suitable knurled finishes may also be employed. Techniques for roll pinning and for providing knurled surfaces are well known in the art.

Figures 4A, 4B, 4C:
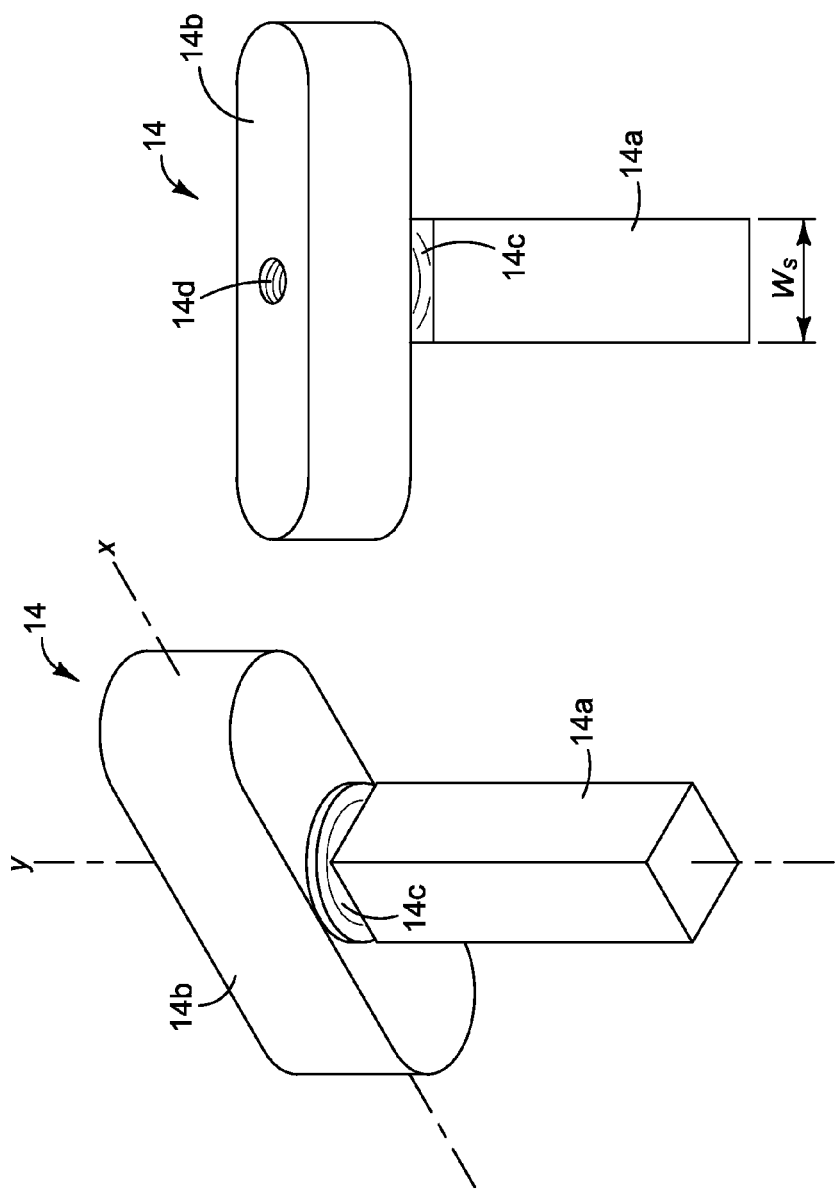
FIGS. 4A to 4F are three-dimensional views illustrating alignment pins, according to various embodiments of the present application.
Figure 4D:
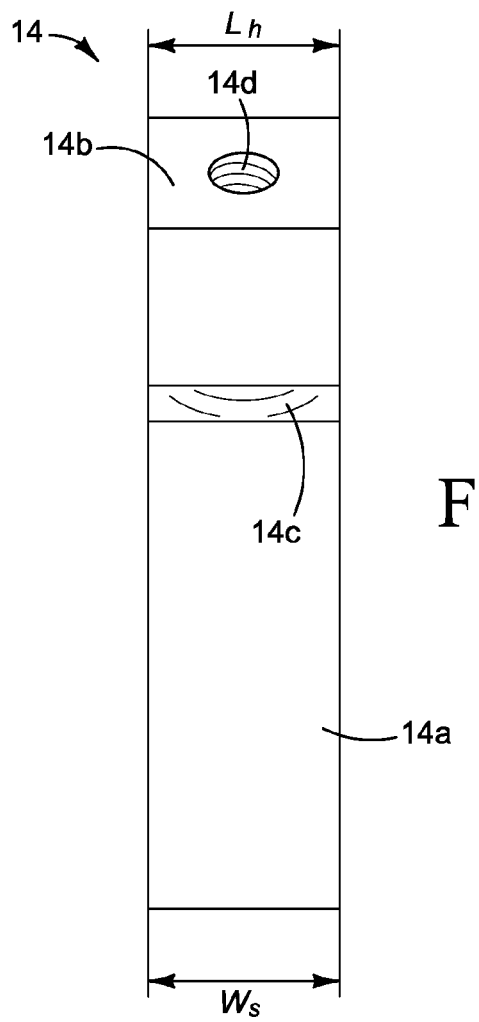
Figure 4E:
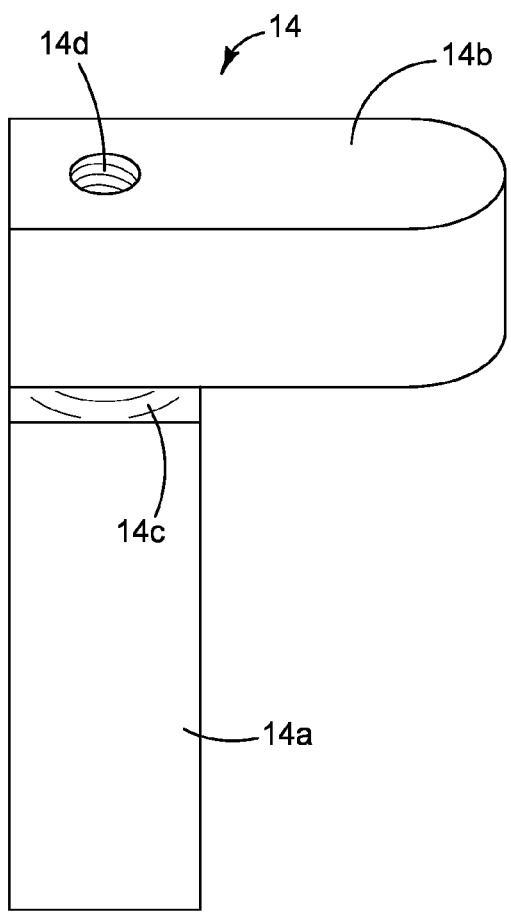

FIGS. 4A to 4C illustrate one embodiment of alignment pin 14, which comprises a head 14b and a shank 14a, which extends from head 14b. Head 14b has a longitudinal axis x which is perpendicular to a longitudinal axis y of shank 14a. Shank 14a has a non-circular cross section, where the cross section is defined by a plane intersecting longitudinal axis y of shank 14a at right angles. In the embodiment shown in FIG. 4A, shank 14a has a square cross section. The square cross section allows shank 14a to be inserted into alignment pin bushing 12 in a frictional slip fit with grooved surface portions 12f, which prevents shank 14a from rotating in aperture 12d, thereby allowing longitudinal axis x of head 14b to be fixed in a desired direction. In other embodiments, the cross section of shank 14a may have any suitable noncircular shape which will allow it to be fixed in the desired position in a bushing having an aperture capable of accepting a shank of that particular shape. For example, the cross section of shank 14a may have a polygon shape other than a square, such as a hexagon or an octagon shape, in which case alignment pin bushing 12 may have an aperture shaped so as to be capable of respectively accepting a shank with a hexagon or octagon shaped cross section.

Figure 6:
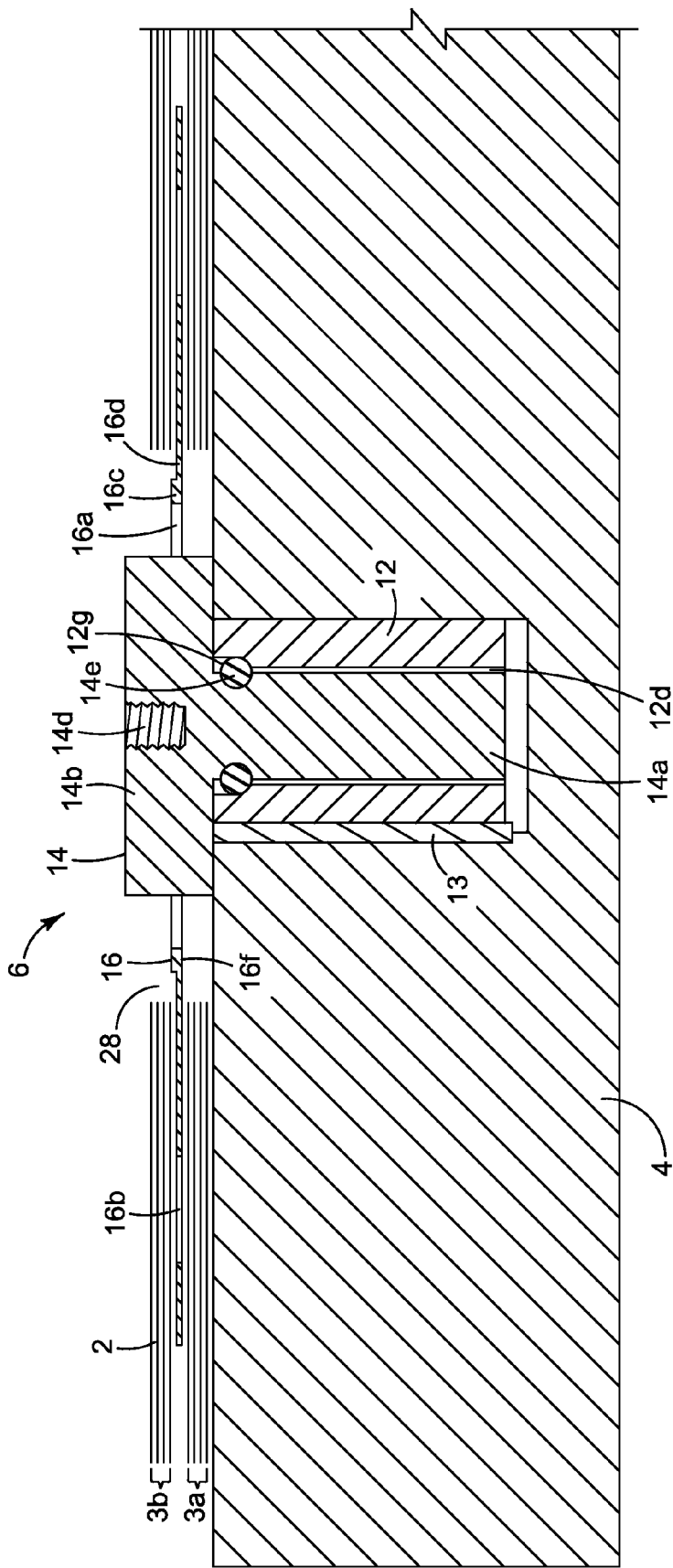
FIG. 6 is a cross-sectional view of a moveable assembly attached to a composite part, which is supported on the surface of a tool, according to one embodiment of the present application.

In some embodiments, a groove 14c is formed around the base of shank 14a, adjacent to head 14b, for accepting an O-ring. An O-ring 14e may be positioned around shank 14a in groove 14c, as illustrated in FIG. 4C. When alignment pin 14 is inserted into aperture 12d of alignment pin bushing 12, as illustrated in FIG. 6, the O-ring 14e rests in O-ring groove 12g and helps to prevent, or reduce the amount of resin which runs down into aperture 12d during processing. O-ring 14e may be made of any suitable material which has the desired elasticity, tolerance to temperature, and compatibility with the particular resin of the composite being processed. In one exemplary embodiment, O-ring 14e may comprise rubber, such as a neoprene rubber.

In the embodiment illustrated in FIG. 4B, a hole 14d is positioned in the top of head 14b. The inner surface of hole 14d may be threaded. This allows a device, such as a slide hammer, to be screwed into hole 14d and used to remove alignment pin 14 from alignment pin bushing 12. In this way, alignment pin 14 may be more easily removed in situations where it becomes lodged in alignment pin bushing 12, such as where resin manages to flow past O-ring 14e during processing and causes alignment pin 14 to stick.

In the embodiment illustrated in FIG. 4A, the head 14b of alignment pin 14 is long and narrow, and extends out on opposite sides of shank 14a, so that alignment pin 14 has a "T" shape. As illustrated in the embodiment of FIG. 5C, the shape of head 14b has a length, $L_h$, and a width, $W_h$, which allows head 14b to act as a guide to aid in properly aligning opening 16a of moveable composite insert 16, as mentioned above. The ratio of $L_h$ to $W_h$ may be any suitable ratio. In one embodiment, the ratio of $L_h$ to $W_h$ may be greater than about 1.5:1, such as, for example, about 2:1 to about 4:1.

In other embodiments, head 14b may have any suitable size or shape which will provide the necessary alignment of moveable composite insert 16. For example, in one embodiment illustrated in FIG. 4D, the length, $L_h$, of head 14b may be the same as the width, $W_s$, of shank 14a, so that the head does not extend from the sides of shank 14a. In another embodiment, head 14b only extends from one side of shank 14a, so as to form a pin illustrated in FIG. 4E.

Figure 4F:
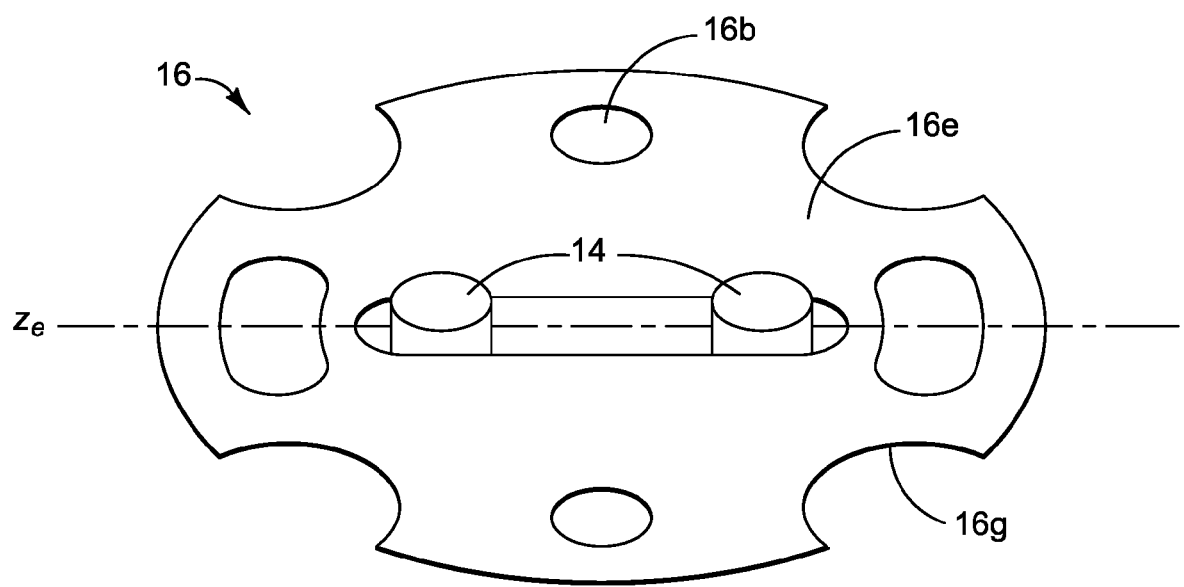

In yet another embodiment, two pins may be used to provide the desired alignment of moveable composite insert 16. FIG. 4F illustrates one such embodiment, where two cylindrical alignment pins 14, which are separated by a small distance, are employed to provide the desired alignment along a desired axis of expansion $z_e$. Still other means for aligning moveable composite insert 16 along the desired axis of expansion would be readily apparent to one of ordinary skill in the art, and fall with in the scope of the present application.

Alignment pin 14 may be made from any suitable material using any suitable machining method. Examples of suitable materials include stainless steel, spring steel, ceramics, carbon and Teflon. Suitable machining methods are well known in the art.

Figure 5A:
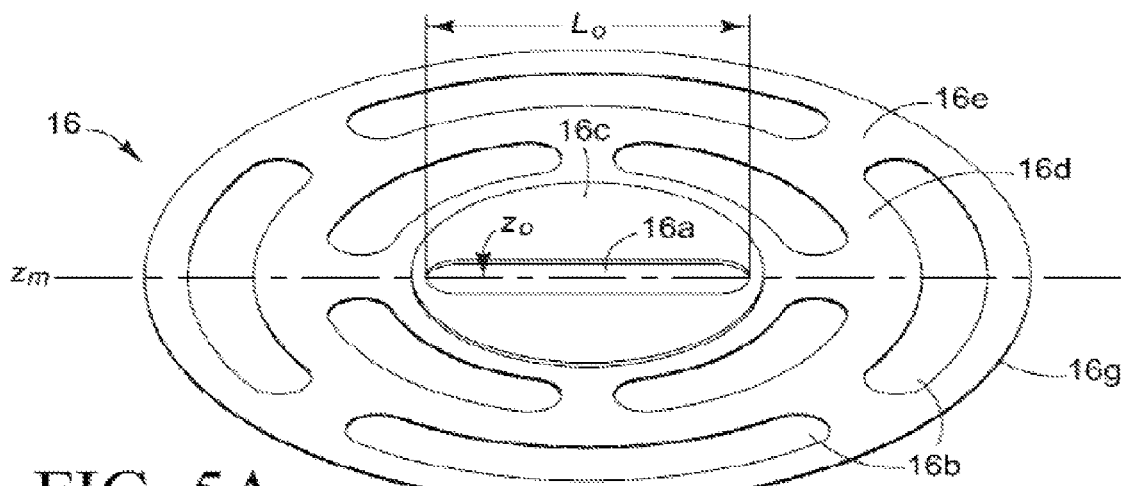
FIGS. 5A to 5C are three-dimensional and topside views illustrating moveable composite inserts, according to various embodiments of the present application.
Figure 5B:
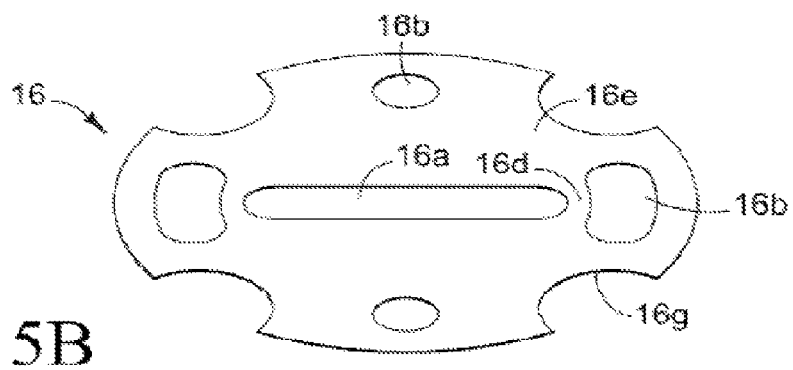
Figure 5C:
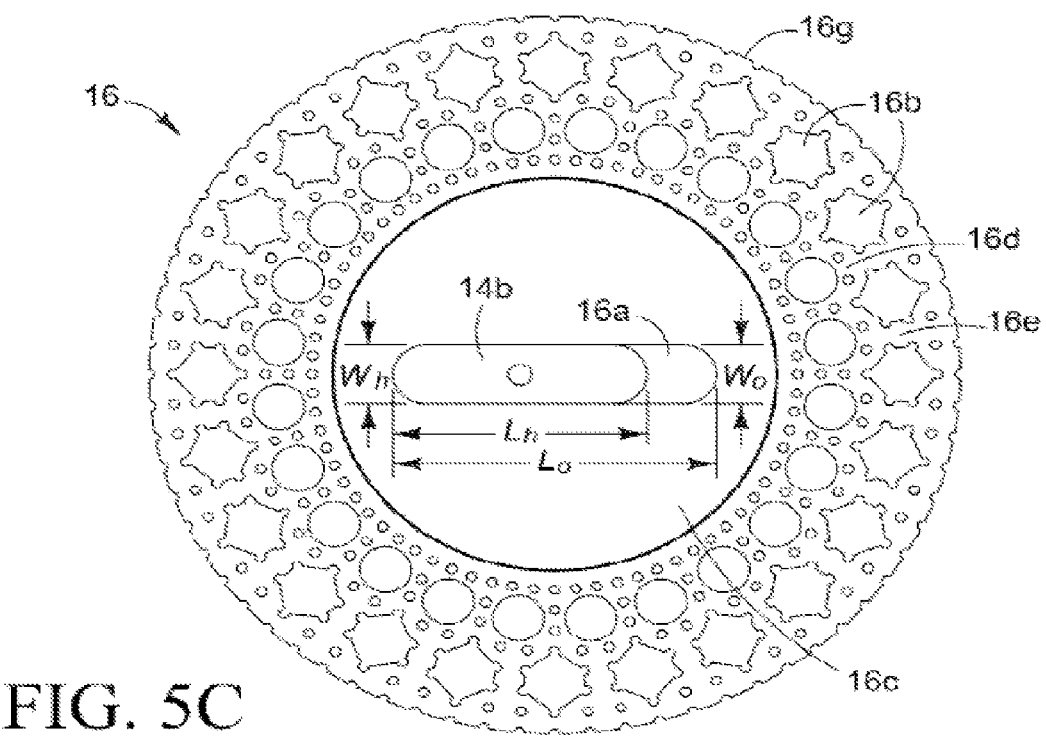

FIGS. 5A to 5C illustrate various exemplary embodiments of a moveable composite insert. As shown in FIG. 5A, moveable composite insert 16 comprises a first major surface 16e, an opposing second major surface 16f (illustrated in FIG. 6), and an outer perimeter edge 16g formed between first and second major surfaces 16e and 16f. An opening 16a is formed through moveable composite insert 16. In one embodiment, as illustrated in FIG. 5A, the longitudinal axis $z_o$ of opening 16a runs along a central axis $z_m$ of moveable composite insert 16. In other embodiments, $z_o$ may be offset from $z_m$.

The size and shape of opening 16a are chosen to allow opening 16a to receive at least one guiding mechanism, such as alignment pin 14, straight pin 32, or some other guiding mechanism, so that opening 16a is capable of controlling movement of movable composite insert 16 in a desired direction when the guiding mechanism is received by opening 16a. Referring to FIG. 5C, opening 16a has a length, $L_o$, which is sufficient to allow the moveable composite insert 16 to move back and forth on the guiding mechanism along the length of opening 16a when the guiding mechanism is positioned within opening 16a. In one embodiment, the width, $W_o$, of opening 16a is sized relative to the guiding mechanism so that movement of the moveable composite insert 16 is substantially limited in at least one direction when the guiding mechanism is positioned within opening 16a.

Figure 7:
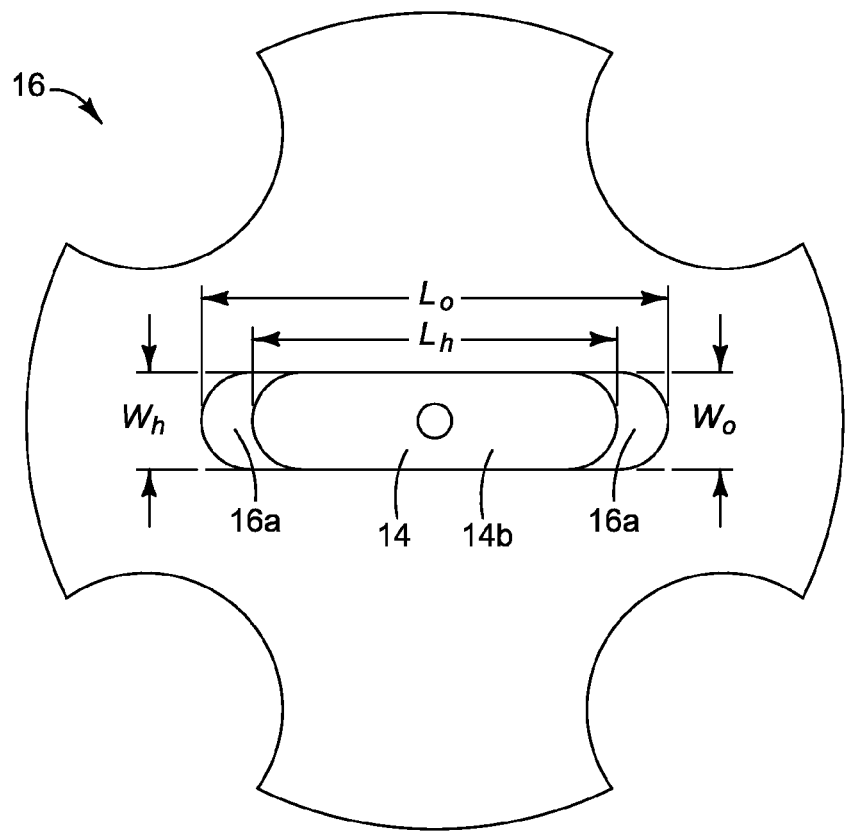
FIG. 7 is a topside view of an alignment pin positioned within an opening of a moveable composite insert, according to one embodiment of the present application.

FIG. 7 illustrates another exemplary embodiment employing alignment pin 14 as the guiding mechanism positioned within opening 16a of moveable composite insert 16. Opening 16a accepts head 14b of alignment pin 14. Opening 16a has a length $L_o$ which is greater than length $L_h$ of head 14b, so as to allow moveable composite insert 16 to move back and forth on head 14b along the length of opening 16a.

In one embodiment, the width, $W_o$ of opening 16a may be only slightly larger than, width $W_h$ of head 14b, so that substantially no movement of head 14b occurs in the direction of width $W_o$ of opening 16a, thereby substantially confining the relative movement of head 14b and moveable composite insert 16 to a back and forth movement along longitudinal axis $z_o$ when head 14b is positioned within opening 16a. In other embodiments, the relative dimensions $W_o$ and $W_h$ may be adjusted to maintain the desired degree of precision in controlling movement of the moveable composite insert in a desired direction in subsequent bonding processes. For example, in embodiments where high alignment tolerances of composite parts in subsequent bonding is desired, the relative sizes, of these dimensions may be adjusted to achieve a high tolerance slip fit arrangement. For example, $W_o$ may be less than about 0.01 inches larger than $W_h$. In another exemplary embodiment, $W_o$ may be about 0.001 to about 0.0001 inches larger than $W_h$.

In one embodiment, the opening is substantially elongated, so that length $L_o$ of opening 16a is substantially greater than width $W_o$. For example, the ratio of $L_o:W_o$ may be two or greater. In one embodiment, the ratio of $L_o:W_o$ may be three or greater, such that opening 16a forms a slot. In other embodiments, opening 16a may have any suitable shape which allows the desired movement of moveable composite insert 16.

In certain embodiments, as illustrated in FIGS. 5A to 5C, a plurality of apertures 16b are formed through moveable composite insert 16. Apertures 16b may be formed between opening 16a and outer perimeter edge 16g, and may enhance bonding with the composite, as will be further described below. Apertures 16b may be formed in any desired configuration which will provide the necessary physical bond between the composite part 2 and moveable composite insert 16 and which will not compromise the structural integrity of moveable composite insert 16. In other embodiments, as illustrated in FIG. 7, moveable composite insert 16 lacks apertures 16b.

In certain embodiments, outer perimeter edge 16g may have an irregular shape, as illustrated in FIGS. 5B and 5C. The irregular shape of outer perimeter edge 16g, along with apertures 16b, may provide an enhanced grip of moveable composite insert 16 to the cured laminate, as will be discussed in greater detail below.

As discussed above, one or more moveable composite inserts 16 may be attached to a composite in a manner which allows the composite to be held in place on a tooling apparatus using the guiding mechanisms described herein. FIG. 6 illustrates a moveable composite insert 16 attached to composite part 2, which is held in position on the surface of tool 4 using bushing 12 and alignment pin 14, according to an embodiment of the present application. Composite part 2, as illustrated in the embodiment of FIG. 6, is a laminate comprising multiple plies 3a and 3b. While composite part 2, as illustrated, comprises eight plies, a laminate having any suitable number of plies is contemplated. Moveable composite insert 16 is held in place between plies 3a and 3b by chemical and/or physical bonds formed between composite part 2 and surfaces of moveable composite insert 16, including major surfaces 16e and 16f.

The chemical and/or physical bond may be formed during curing of composite part 2, and may be enhanced by properly preparing the surface of moveable composite insert 16 prior to the cure operation. For example, the surface of moveable composite insert 16 may be cleaned to remove oils or dirt which may reduce or prevent chemical bonding between the moveable composite insert 16 and composite part 2. In another embodiment, the surface of moveable composite insert 16 may be coated to enhance chemical bonding prior to the cure operation. For example, in some embodiments, an adhesion promoting primer is applied to the surface of moveable composite insert 16. In other embodiments, the surface of moveable composite insert 16 is covered with "B"-staged film adhesive to promote bonding to composite part 2. In yet another embodiment, the surface of moveable composite insert 16 may be roughened, such as, for example by etching, to provide enhanced bonding. Other suitable techniques for enhancing chemical bonding between moveable composite insert 16 and composite part 2 would be readily apparent to one of ordinary skill in the art and may also be employed.

In the embodiments illustrated in FIGS. 5A to 5C, apertures 16b and/or the irregular shaped outer perimeter edge 16g may promote the physical bond of composite part 2 to moveable composite insert 16. While not intending to be limited by theory, it is believed that the wet plies of composite part 2 may press through apertures 16b, so that once cured, composite part 2 physically grips moveable composite insert 16. Apertures 16b may be formed in any desired configuration which will provide the desired physical bond, and which will not compromise the structural integrity of moveable composite insert 16.

Moveable composite insert 16 may have any desired dimensions. The particular shape and size may be adjusted depending on, for example, the size of the offal in which moveable composite insert 16 will be positioned, and the amount of bonding surface required to hold moveable composite insert 16 in place in the composite. A greater bonding surface area between composite part 2 and moveable composite insert 16 may result in moveable composite insert 16 being held more firmly in place.

Moveable composite insert 16 may include a raised portion 16c corresponding to a thicker region surrounding opening 16a, as seen in FIGS. 5A and 6. Raised portion 16c allows the bearing strength of moveable composite insert 16 to be increased around opening 16a, while at the same time allowing the outer portion 16d of moveable composite insert 16 to have a reduced thickness. A reduced thickness of outer portion 16d will reduce the space between the plies on either side of moveable composite insert 16, and thereby reduce the overall effect of inserting the moveable composite insert 16 on the thickness of the finished composite part 2. This may provide benefits in certain embodiments where it is undesirable to significantly increase the thickness of the composite laminate proximate the composite insert.

Moveable composite insert 16 may be formed using any suitable method. Examples of such methods include machining techniques, such as electric discharge machining (EDM) or metal stamping techniques, both of which are well known in the art.

Moveable composite insert 16 may be made from any suitable material. Examples of suitable materials include stainless steel, spring steel, ceramics, carbon and Teflon.

Moveable composite insert 16 may be attached to composite part 2 using any technique which will result in chemical and/or physical bonding suitable to hold moveable composite insert 16 in place in the composite, while at the same time providing the proper alignment of opening 16a. For example, as illustrated in the embodiment of FIG. 6, moveable composite insert 16 may be bonded between plies 3a and 3b of composite part 2. In this process, holes 28 are formed in wet plies 3a and 3b at the position where moveable composite insert 16 is to be inserted. One or more wet plies 3a are then positioned on tool 4 so that alignment pin bushing 12 is exposed through holes 28. Moveable composite insert 16 is then placed on wet plies 3a so that opening 16a is aligned in a desired direction.

The desired direction may depend on a number of factors such as, for example, the size and shape of the tool, the size and shape of the wet composite part, the size and shape of the parts to which the composite part may be subsequently bonded, as well as the relative CTE values for the tool and/or the composite materials. In one exemplary embodiment, longitudinal axis, $z_o$, of opening 16a may be aligned in the direction of the major axis of expansion of composite part 2. In another embodiment, longitudinal axis, $z_o$, of opening 16a may be aligned in the direction of the major axis of expansion of tool 4. In yet other embodiments, where a circular or arched tool is employed, it may be desirable to align opening 16a along a radius of the circle or in a direction of the curvature of the arch. One of ordinary skill in the art may readily envision additional embodiments in which it would be desirable to align opening 16a along another axis of expansion. Such additional embodiments fall within the scope of the present application.

Alignment pin 14 may be inserted through opening 16a into aperture 12d of alignment pin bushing 12, so that head 14b lies within opening 16a, as seen in FIG. 6. In an alternative embodiment, alignment pin 14 may be inserted into alignment pin bushing 12, and then moveable composite insert 16 may be positioned so that head 14b lies within opening 16a. As discussed above, head 14b is fixed in position when shank 14a is inserted into alignment pin bushing 12, so that head 14b maintains the alignment of opening 16a in a desired direction during subsequent cure steps.

After moveable composite insert 16 is positioned on wet plies 3a, one or more additional plies 3b are positioned over wet plies 3a and portions of moveable composite insert 16. Holes 28 in plies 3b are positioned so as to expose alignment pin 14 and the slotted portion of moveable composite insert 16. The temperature of composite part 2 is then ramped up to the desired cure temperature and moveable composite insert 16 is bonded to composite part 2.

During the cure operation, and the resulting thermal expansion of composite part 2, alignment pin 14 maintains the desired alignment of opening 16a, since longitudinal axis $z_o$ of opening 16a is aligned in the same direction as longitudinal axis $x_o$ of head 14b when head 14b is positioned within opening 16a. Thus, alignment pin 14 acts as a guiding mechanism for controlling the direction of longitudinal axis $z_o$ of opening 16a while allowing moveable composite insert 16 to move along head 14b during the cure step. In this manner, moveable composite insert 16 may be bonded to composite part 2 so that longitudinal axis $z_o$ of opening 16a is fixed in the desired direction. The orientation of longitudinal axis $z_o$ of opening 16a relative to composite part 2 determines the direction composite part 2 is allowed to move relative to the surface of tool 4 during subsequent thermal expansion.

After moveable composite insert 16 is bonded in place in composite part 2, alignment pin 14 may be replaced by a straight pin 32, as illustrated in the embodiment of FIG. 9, if desired. The head of straight pin 32 is has a decreased length compared to the length, $L_h$, of head 14b of alignment pin 14, which may allow increased room for movement of moveable composite insert 16 on the head of straight pin 32. The increased movement may be desirable during high temperature processing, such as post-curing, where an increased degree of thermal expansion may occur in the tool 4 and/or the composite part 2.

During subsequent thermal cycles, the guiding mechanism, such as, for example, straight pin 32 or alignment pin 14, allows composite part 2 to move along opening 16a. As discussed above, opening 16a controls the movement of moveable composite insert 16, and hence the movement of composite part 2, to which moveable composite insert 16 is bonded. In this manner, the relative position of composite part 2 on tool 4 may be maintained along a desired axis of thermal expansion.

Figures 8A, 8B:
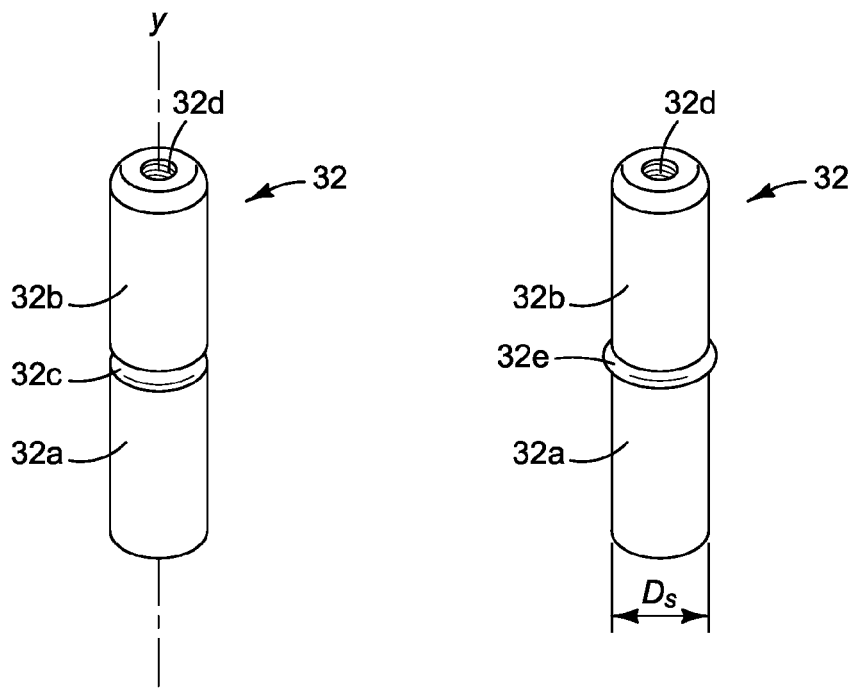
FIGS. 8A and 8B are three-dimensional views illustrating straight pins, according to one embodiment of the present application.

FIGS. 8A and 8B illustrate one embodiment of a straight pin 32. In the illustrated embodiment, straight pin 32 comprises a groove 32c to allow placement of an O-ring 32e around shank 32a, similarly as described above for alignment pin 14. Also similar to alignment pin 14, straight pin 32 may include a hole 32d positioned in the top of head 32b, the inner surface of which may be threaded so that a slide hammer, or other device, may be screwed into hole 32d and used to remove straight pin 32 from alignment pin bushing 12. In the embodiment of FIGS. 8A and 8B, shank 32a of straight pin 32 has a circular cross section formed by a plane intersecting a longitudinal axis y of shank 32a at right angles. However, straight pin 32 may have any suitably shaped cross section, such as a square, or other polygon shaped, cross section.

Figure 10:
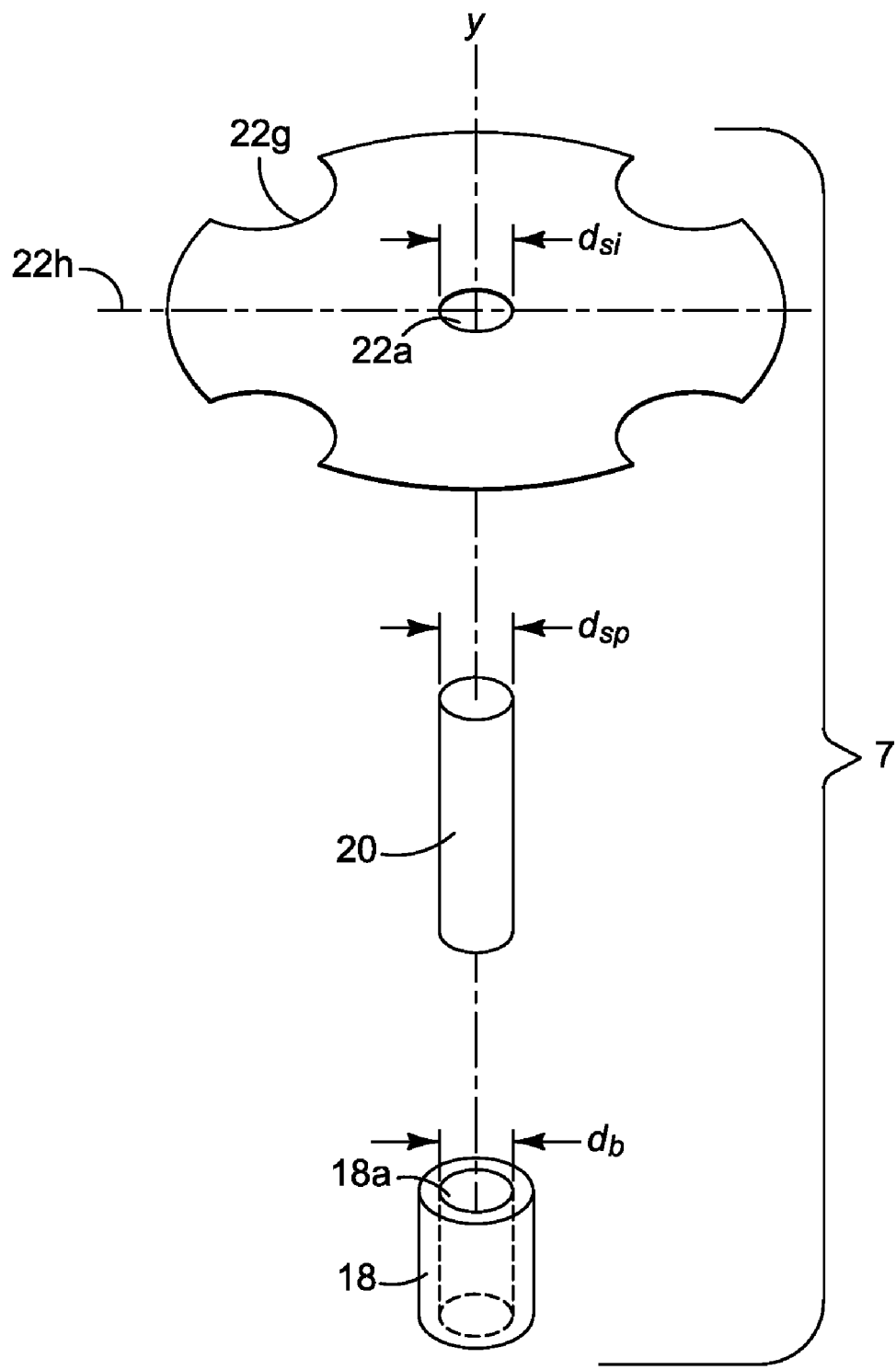
FIG. 10 is an exploded view of a stationary assembly, according to one embodiment of the present application.

Stationary assembly 7, as discussed above with respect to the embodiment of FIG. 2, will now be described in more detail. As illustrated in the embodiment of FIG. 10, stationary assembly 7 may comprise a stationary pin bushing 18, a stationary pin 20 and a stationary composite insert 22.

Stationary composite insert 22 may be similar to moveable composite insert 16 described above, except that opening 22a of stationary composite insert 22 is designed to accept stationary pin 20 so as to hold stationary composite insert 22 substantially stationary. In the embodiment illustrated in FIG. 10, stationary composite insert 22 has an opening 22a having approximately the same dimensions as a cross section of stationary pin 20, the cross section being formed by a plane intersecting a longitudinal axis y of stationary pin 20 at right angles. In this manner, stationary composite insert 22 may be held substantially stationary in all directions perpendicular to the longitudinal axis y of stationary pin 20 by positioning the stationary composite insert 22 and stationary pin 20 so that stationary pin 20 extends through opening 22a.

Diameter, $d_{si}$, of opening 22a may be formed to be only slightly larger than, the diameter, $d_{sp}$, of the cross section of stationary pin 20, so that stationary pin 20 may fit through opening 22a in a frictional slip fit arrangement. The relative dimensions of $d_{si}$ and $d_{sp}$ may be adjusted to maintain the desired degree of precision in holding composite part 2 stationary. For example, in embodiments where very high alignment tolerances of composite parts in subsequent bonding is desired, the relative sizes of these dimensions may be adjusted to achieve the desired tolerances. In one embodiment, $d_{si}$ may be formed to be less than about 0.01 inches larger than $d_{sp}$. In another exemplary embodiment, $d_{si}$ may be about 0.001 to about 0.0001 inches larger than $d_{sp}$.

Opening 22a may have any suitable shape or size which corresponds to the dimensions of stationary pin 20. For example, in the embodiment illustrated in FIG. 10, both opening 22a and the cross section of stationary pin 20 have a circular shape. In other embodiments, both the cross section of stationary pin 20 and opening 22a may be square, for example.

Figure 11:
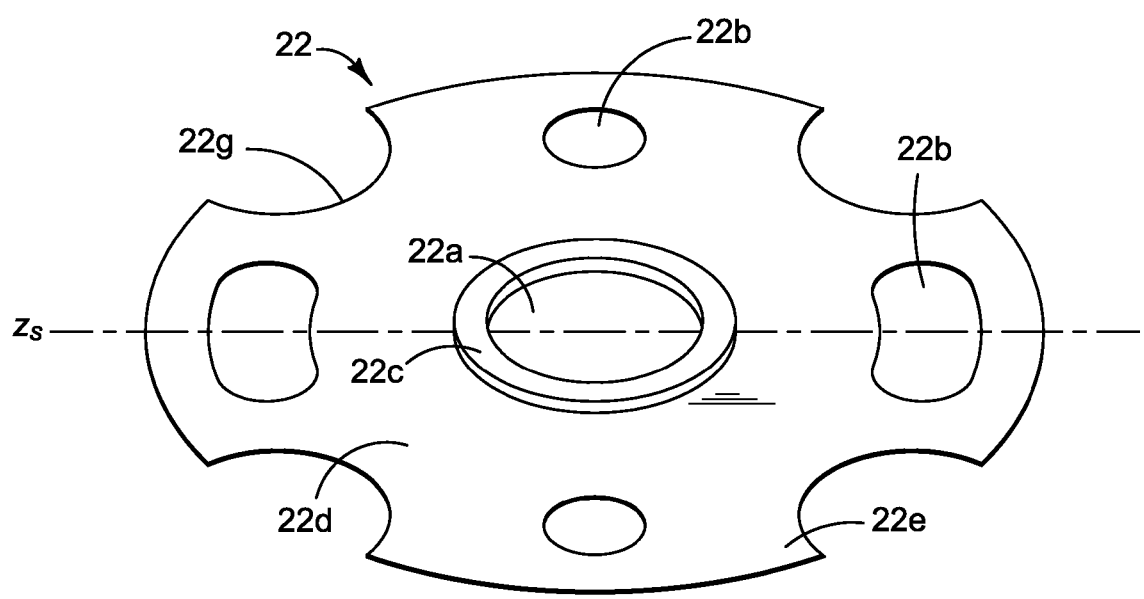
FIG. 11 is a three-dimensional view of a stationary composite insert, according to one embodiment of the present application.

As shown in FIG. 11, stationary composite insert 22 comprises a first major surface 22e, an opposing second major surface (not shown), and an outer perimeter edge 22g formed between the first and second major surfaces. In the illustrated embodiment, opening 22a is formed through stationary composite insert 22 along a central axis $z_s$. In other embodiments, opening 22a may be offset from central axis $z_s$. In one embodiment, a plurality of apertures 22b may be formed through stationary composite insert 22, the apertures 22b being formed between opening 22a and outer perimeter edge 22g. Apertures 22b may be formed in any desired configuration which will provide the necessary physical bond between the composite part and stationary composite insert 22, and which will not compromise the structural integrity of stationary composite insert 22. In another embodiment illustrated in FIG. 10, stationary composite insert 22 lacks apertures 22b.

Stationary composite insert 22 may be attached to composite structures using any of the techniques described above for attaching moveable composite insert 16 to composite part 2, such as bonding stationary composite insert 22 between plies of a composite part, as described above with reference to FIG. 6. Stationary composite insert 22 may be held in place between the plies of composite part 2 by chemical and/or by physical bonding, in a similar manner to that described above for moveable composite insert 16. The chemical bond may be enhanced by properly preparing the surface of stationary composite insert 22 prior to the cure operation, such as by cleaning the surface of stationary composite insert 22 to remove oils or dirt, and/or by treating the surface of stationary composite insert 22 by chemically etching and/or applying an adhesion promoting primer or other coating, similarly as discussed above for moveable composite insert 16.

The first and/or second major surfaces of stationary composite insert 22 may include a raised portion 22c surrounding opening 22a, similar to raised portion 16c of moveable composite insert 16, as described above with reference to FIG. 5A. This would allow the bearing strength of stationary composite insert 22 to be increased around opening 22a, while at the same time allowing an outer portion 22d of stationary composite insert 22 to have a reduced thickness, which may be beneficial for the reasons set forth above in the discussion of moveable composite insert 16.

Stationary composite insert 22 may be formed using any suitable technique, including the techniques described above for making moveable composite insert 16, including machining techniques, such as EDM or metal stamping techniques.

Stationary pin 20, illustrated in the embodiment of FIG. 10, may be any suitable pin which may be used in combination with stationary composite insert 22 to hold composite part 2 stationary. For example, a straight pin 32, having O-ring 32e and a threaded hole 32d, described above in connection with FIG. 8, may be employed. In another embodiment, a straight pin without an O-ring and/or a threaded hole 32d, may be employed. In yet another embodiment, a straight pin having a cross section which is not circular may be employed. For example, a straight pin having a square cross section may be used where opening 22a of stationary composite insert is square. As described above, the cross sectional dimensions of stationary pin 20 are chosen to provide a frictional slip fit arrangement with opening 22a of stationary composite insert 22, in order to hold stationary composite insert 22 substantially stationary.

Referring back to FIG. 10, stationary pin bushing 18 may be any suitable bushing which may be employed in combination with stationary pin 20 and stationary composite insert 22 to hold composite part 2 stationary. For example, stationary pin bushing 18 may have an aperture 18a with a circular shaped cross section. Such bushings having apertures with circular shaped cross sections are well known in the art. In other embodiments, a bushing having a cross section which is not circular may be employed, such as, for example, a bushing having a square cross section. In one embodiment, stationary pin bushing 18 may have an aperture 18a with a circular shaped cross section, and a groove shaped to accept an O-ring positioned in the inner surface at one end of aperture 18a, similar to groove 12g in FIG. 3A. In yet another embodiment, the bushings described above with reference to FIGS. 3A to 3E may be employed as the stationary pin bushing.

Stationary pin bushing 18 may be chosen so as to have an aperture 18a with dimensions which will provide a frictional slip fit relationship with stationary pin 20. For example, in the embodiment of FIG. 10, the diameter $d_b$ of aperture 18a may be chosen to be slightly larger than diameter $d_{sp}$ of stationary pin 20. The relative dimensions of aperture 18a, and the diameter of stationary pin 20 may be adjusted to achieve any desired tolerances, including a high tolerance slip fit arrangement. For example, $d_b$ may be formed to be less than about 0.01 inches larger than $d_{sp}$. In another exemplary embodiment, $d_b$ may be about 0.001 to about 0.0001 inches larger than $d_{sp}$.

The stationary assemblies of the present application, including stationary composite insert 22, stationary pin 20, and stationary pin bushing 18 may be made from any suitable material. Examples of suitable materials include stainless steel, spring steel, ceramics, carbon and Teflon.

The individual parts of both the moveable and stationary assemblies may be made from the same or different materials. For example, the moveable composite insert 16 may comprise a ceramic material while the alignment pin 14 and/or the alignment pin bushing 12 may comprise steel.

As discussed above, various combinations of moveable and stationary assemblies may be employed to control the direction of thermal expansion during fabrication of a composite part. During thermal processing, the composite part is held stationary relative to the surface of the tool at one or more stationary positions of the composite part, while allowing the composite part to move in a desired direction of thermal expansion relative to the surface of the tool at one or more moveable positions of the composite part. For example, as discussed above with reference to FIG. 1, by positioning one or more stationary assemblies at stationary position 8 and one or more moveable assemblies at moveable position 6, composite part 2 may be allowed to expand from stationary position 8 toward movable position 6, along the major axis of expansion z.

Figure 12:
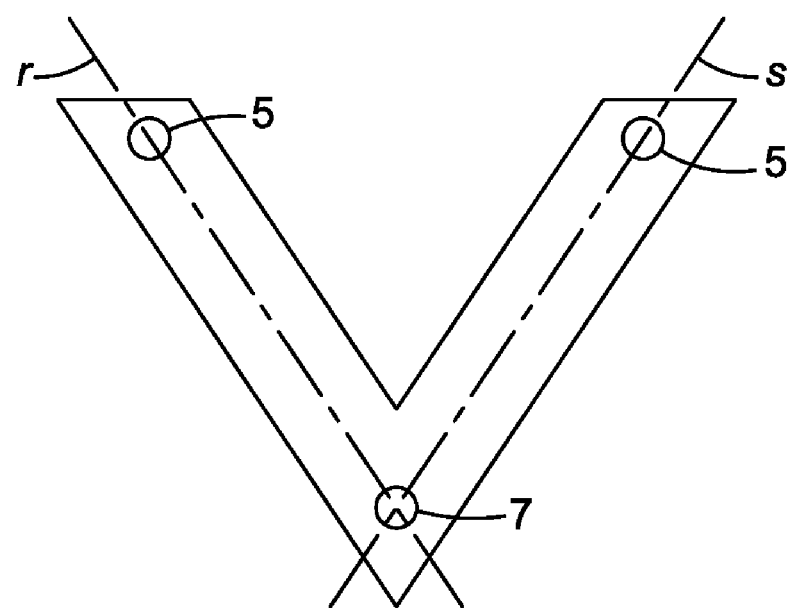
FIG. 12 is a topside view of a composite part having stationary and moveable assemblies positioned therein, according to one embodiment of the present application.

The arrangement of the moveable and stationary assemblies will vary depending on the shape and size of the composite part. For example, if the part has a "V" shape, as illustrated in FIG. 12, it may be desirable to position a stationary assembly 7 at the bottom of the "V" and a moveable assembly 5 at the top of each branch of the "V," as shown in FIG. 12. In this manner the bottom of the "V" is held stationary, while movement at the top of each branch of the "V" is controlled so that thermal expansion occurs along the r and s axes.

Figure 13:
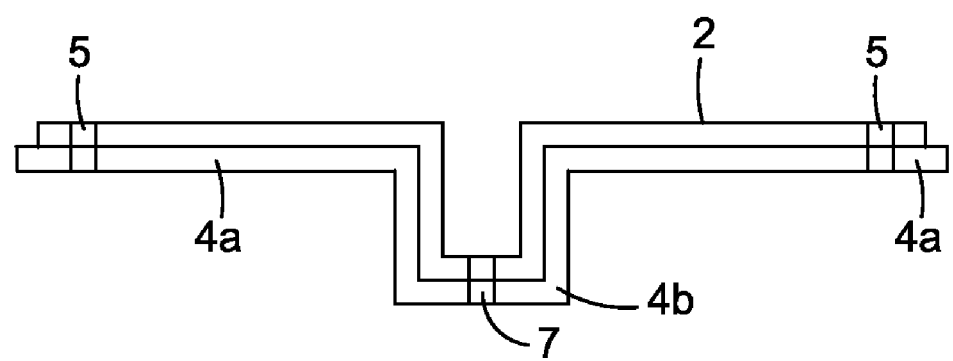
FIG. 13 is a cross-sectional view of a composite part having stationary and moveable assemblies positioned therein, according to one embodiment of the present application.

Yet another embodiment is illustrated in FIG. 13, which shows a cross section of a tool having planar portions 4a, with a pocket 4b formed therein, for forming a three dimensional composite part 2. In this embodiment, it may be desirable to position moveable assemblies 5 at either end of composite part 2, and a stationary assembly 7 in the pocket area, as shown, in order to allow for thermal expansion from the pocket toward either end of composite part 2 during thermal processing. One of ordinary skill in the art would readily envision yet other possible configurations of moveable and stationary assemblies to effectively control the direction of thermal expansion of composite parts.

Figure 14:
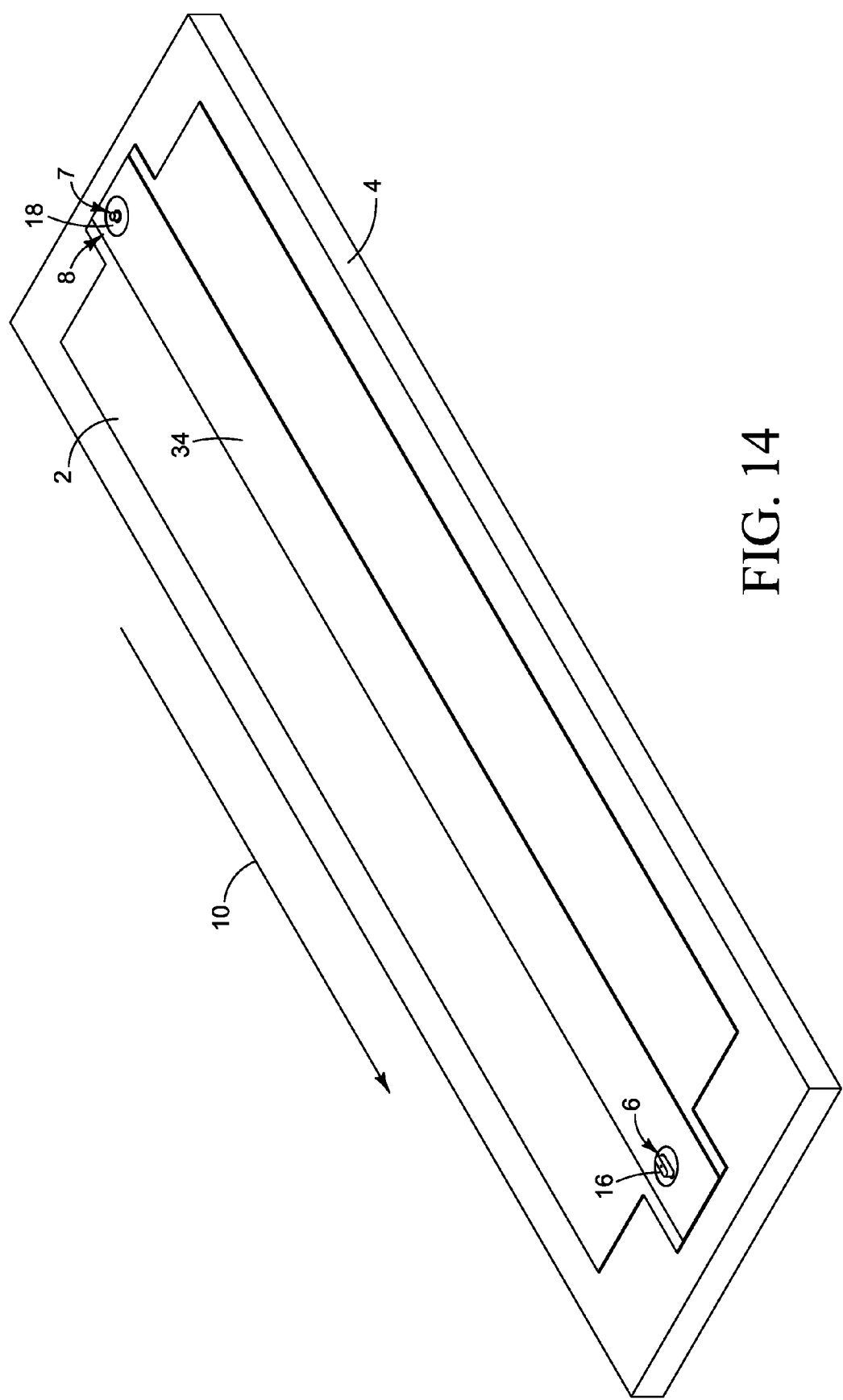
FIG. 14 is a three-dimensional view of two composite parts positioned relative to one another using stationary and moveable assemblies, according to one embodiment of the present application.

In embodiments where two or more composite parts of a composite assembly are being bonded together, the direction of thermal expansion may be controlled so that the two or more composite parts expand in the same direction and/or along the same axis of expansion, allowing for improved alignment tolerances. For example, as illustrated in FIG. 14, a composite part 34 may be placed on composite part 2. Moveable composite insert 16 and stationary composite insert 22 have been attached to composite part 34 at moveable position 6 and stationary position 8, respectively. In this arrangement, both composite part 2 and composite part 34 are allowed to thermally expand along the same axis of expansion and in the same direction relative to stationary position 8. It is believed that controlling the relative movement of the composite parts with respect to each other and/or with respect to the surface of tool 4 may result in improved alignment tolerances compared to bonding processes where relative movements due to thermal expansion are not similarly controlled.

Figure 15:
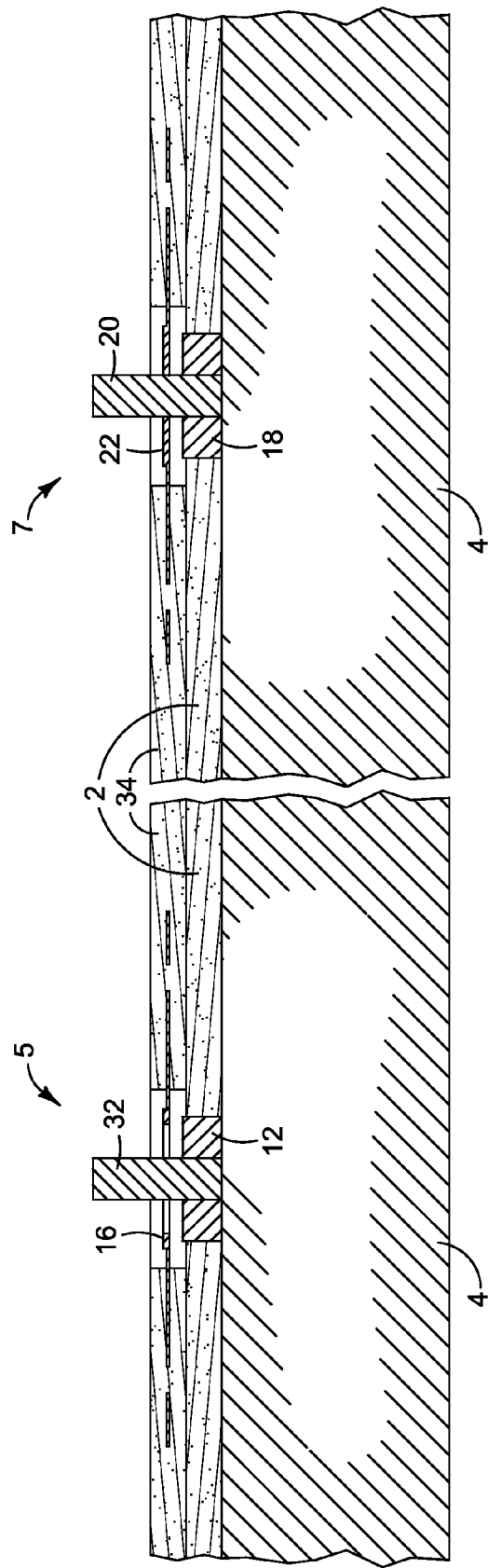
FIG. 15 is a cross sectional view of a moveable assembly where the bushing is inserted into a composite part, rather than into the surface of the tool, according to one embodiment of the present application.

FIG. 15 illustrates another embodiment where two or more composite parts of a composite assembly are bonded together. In this embodiment, one or more moveable assemblies 5 and one or more stationary assemblies 7 may be used to control the direction of thermal expansion of the composite parts, similarly as discussed above in the embodiment of FIG. 2, except that the alignment pin bushings 12 and stationary pin bushings 18 are positioned in composite part 2, rather than in the surface of tool 4. In the embodiment of FIG. 15, alignment pin bushing 12 and stationary pin bushing 18 may be positioned in composite part 2 by, for example, drilling a hole in the already cured composite part 2, or alternatively by bonding the alignment pin bushing 12 and stationary pin bushing 18 into composite part 2 during the cure operation. One or more moveable composite inserts 16 and stationary composite inserts 22 may be attached to composite part 34. Composite part 34 may then be held in position on composite part 2 using pins, such as straight pin 32 and stationary pin 20, as illustrated in the embodiment of FIG. 15. In this manner, the desired alignment of composite part 34 with composite part 2 may be accomplished. This embodiment may be useful in situations where the tooling equipment, such as tool 4 described above, has not been fitted for bushings, such as alignment pin bushings 12 and/or stationary pin bushings 18.

Although this disclosure has been described in terms of certain preferred embodiments, other embodiments apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

The invention claimed is:

1. A system for controlling the direction of thermal expansion of a composite part during thermal processing, the system comprising:
    at least one guiding mechanism attached in a fixed position to a tool for fabricating composites; and
    at least one moveable composite insert attached to the composite part and having an opening receiving the at least one guiding mechanism;
    the opening having a configuration capable of controlling movement of the composite part in a controlled manner relative to the tool when the guiding mechanism is received by the opening.

2. The system of claim 1, wherein the configuration of the opening is substantially elongated such that movement of the composite insert is controlled to be a substantially back and forth movement.

3. The system of claim 1, wherein the configuration of the opening is substantially elongated along an axis of expansion of the composite part to which the moveable composite insert is attached.

4. The system of claim 1, comprising a plurality of the guiding mechanisms attached to the tool and a corresponding plurality of the moveable composite inserts attached to the composite part.

5. The system of claim 1, wherein the at least one guiding mechanism comprises an alignment pin having a head and a shank, the shank having a non-circular cross section formed in a plane intersecting a longitudinal axis of the shank at right angles, the head having a longitudinal axis which is perpendicular to the longitudinal axis of the shank.

6. The system of claim 5, wherein the opening of the at least one moveable composite insert is a slot-shaped opening, the slot shaped opening being sized to fit around the head of the at least one alignment pin so that a longitudinal axis of the slot is aligned in the same direction as the longitudinal axis of the head of the at least one alignment pin when the head is positioned within the opening.

7. The system of claim 6, further comprising at least one alignment pin bushing capable of accepting the shank of the at least one alignment pin in a manner which allows a longitudinal axis of the head to be fixed in a desired direction when the shank is inserted into the at least one alignment pin bushing.

8. The system of claim 7, wherein the alignment pin bushing is positioned in the tool for fabricating composites, the tool having a major axis of expansion defined by the direction of greatest thermal expansion of a surface of the tool when the tool is heated, the alignment pin bushing being positioned in a manner which allows the longitudinal axis of the head of the alignment pin to be aligned in the same direction as the major axis of expansion of the tool when the shank of the alignment pin is inserted into the at least one alignment pin bushing.

9. The system of claim 7, wherein the alignment pin bushing is capable of accepting a shank of a second pin in place of the shank of the alignment pin, the shank of the second pin having a circular cross section formed by a plane intersecting a longitudinal axis of the shank of the second pin at right angles.

10. The system of claim 9, wherein the alignment pin bushing is capable of accepting both the shank of the alignment pin and the shank of the second pin in a frictional slip fit arrangement.

11. The system of claim 1, further comprising:
at least one stationary pin having a head and a shank and attached in a fixed position to the tool; and
at least one stationary composite insert attached to the composite part and having an opening capable of receiving the head of the at least one stationary pin, the stationary composite insert opening having approximately the same dimensions as a cross section formed by a plane intersecting a longitudinal axis of the head of the at least one stationary pin at right angles, so that the stationary composite insert opening may be inserted on the head of the stationary pin to hold the at least one stationary composite insert substantially stationary in all directions perpendicular to the longitudinal axis of the head of the at least one stationary pin.

12. The system of claim 11, further comprising at least one stationary pin bushing capable of accepting the shank of the at least one stationary pin.

13. An aircraft composite part comprising:
a composite material; and
one or more composite inserts attached to the composite material, the one or more composite inserts comprising
a first major surface, an opposing second major surface, and an outer perimeter edge formed between the first and second major surfaces; and
an opening formed through the composite insert between the first and second major surfaces;
wherein the aircraft composite part is an unfinished part which further comprises an offal, the one or more composite inserts being attached to the offal.

14. The aircraft composite part of claim 13, wherein the one or more composite inserts comprise at least one moveable composite insert and at least one stationary composite insert.

15. A system for controlling the direction of thermal expansion of a composite part during thermal processing, the system comprising:
at least one guiding mechanism capable of being attached to a surface of a tool for fabricating composites, the at least one guiding mechanism comprising an alignment pin having a head and a shank, the shank having a non-circular cross section formed in a plane intersecting a longitudinal axis of the shank at right angles, the head having a longitudinal axis which is perpendicular to the longitudinal axis of the shank; and
at least one moveable composite insert capable of being attached to the composite part and having an opening for receiving the at least one guiding mechanism, the opening having a configuration capable of controlling movement of the composite insert in a controlled manner when the guiding mechanism is received by the opening.

16. The system of claim 15, wherein the opening of the at least one moveable composite insert is a slot-shaped opening, the slot shaped opening being sized to fit around the head of the at least one alignment pin so that a longitudinal axis of the slot is aligned in the same direction as the longitudinal axis of the head of the at least one alignment pin when the head is positioned within the opening.

17. The system of claim 16, further comprising at least one alignment pin bushing capable of accepting the shank of the at least one alignment pin in a manner which allows a longitudinal axis of the head to be fixed in a desired direction when the shank is inserted into the at least one alignment pin bushing.

18. The system of claim 17, wherein the alignment pin bushing is positioned in the surface of the tool for fabricating composites, the tool having a major axis of expansion defined by the direction of greatest thermal expansion of the surface of the tool when the tool is heated, the alignment pin bushing being positioned in a manner which allows the longitudinal axis of the head of the alignment pin to be aligned in the same direction as the major axis of expansion of the tool when the shank of the alignment pin is inserted into the at least one alignment pin bushing.

19. The system of claim 17, wherein the alignment pin bushing is capable of accepting a shank of a second pin in place of the shank of the alignment pin, the shank of the second pin having a circular cross section formed by a plane intersecting a longitudinal axis of the shank of the second pin at right angles.

20. The system of claim 19, wherein the alignment pin bushing is capable of accepting both the shank of the alignment pin and the shank of the second pin in a frictional slip fit arrangement.

21. A system for controlling the direction of thermal expansion of a composite part during thermal processing, the system comprising:
at least one guiding mechanism capable of being attached to a surface of a tool for fabricating composites;
at least one moveable composite insert capable of being attached to the composite part and having an opening for receiving the at least one guiding mechanism, the opening having a configuration capable of controlling movement of the composite insert in a controlled manner when the guiding mechanism is received by the opening;
at least one stationary pin having a head and a shank;
at least one stationary composite insert having an opening capable of receiving the head of the at least one stationary pin, the stationary composite insert opening having approximately the same dimensions as a cross section formed by a plane intersecting a longitudinal axis of the head of the at least one stationary pin at right angles, so that the stationary composite insert opening may be inserted on the head of the stationary pin to hold the at least one stationary composite insert substantially stationary in all directions perpendicular to the longitudinal axis of the head of the at least one stationary pin; and
at least one stationary pin bushing capable of accepting the shank of the at least one stationary pin.

\* \* \* \* \*